(12) United States Patent
Tie et al.

(10) Patent No.: US 12,470,958 B2
(45) Date of Patent: Nov. 11, 2025

(54) COMMUNICATION METHOD AND APPARATUS

(71) Applicant: HUAWEI TECHNOLOGIES CO., LTD., Shenzhen (CN)

(72) Inventors: Xiaolei Tie, Shanghai (CN); Han Zhou, Shanghai (CN); Wenwen Huang, Shanghai (CN); Zhanzhan Zhang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 364 days.

(21) Appl. No.: 18/154,623

(22) Filed: Jan. 13, 2023

(65) Prior Publication Data

US 2023/0156500 A1 May 18, 2023

Related U.S. Application Data

(63) Continuation of application No. PCT/CN2021/106752, filed on Jul. 16, 2021.

(30) Foreign Application Priority Data

Jul. 16, 2020 (CN) .......................... 202010688212.9

(51) Int. Cl.
*H04W 24/08* (2009.01)
*H04W 56/00* (2009.01)
*H04W 68/02* (2009.01)

(52) U.S. Cl.
CPC ......... *H04W 24/08* (2013.01); *H04W 56/001* (2013.01); *H04W 68/02* (2013.01)

(58) Field of Classification Search
CPC ...... H04W 76/28; H04W 68/02; H04W 68/00
See application file for complete search history.

(56) References Cited

U.S. PATENT DOCUMENTS

| 2020/0107294 | A1 | 4/2020 | Ji et al. | |
| 2020/0252907 | A1* | 8/2020 | Rune | ....................... H04W 8/24 |
| 2021/0227496 | A1* | 7/2021 | Ly | ......................... H04L 5/0048 |
| 2022/0070783 | A1* | 3/2022 | Hsieh | ................ H04W 52/0235 |

FOREIGN PATENT DOCUMENTS

| CN | 109286966 A | 1/2019 | |
| CN | 109327889 A | 2/2019 | |
| CN | 110167109 A | 8/2019 | |
| CN | 111148221 A | 5/2020 | |
| CN | 111385826 A | 7/2020 | |
| WO | 2018201499 A1 | 11/2018 | |
| WO | 2019029711 A1 | 2/2019 | |
| WO | WO-2019064236 A2 * | 4/2019 | ........ H04W 56/0015 |
| WO | WO-2020216242 A1 * | 10/2020 | ......... H04L 27/2602 |

\* cited by examiner

*Primary Examiner* — Yee F Lam
(74) *Attorney, Agent, or Firm* — Leydig, Voit & Mayer, Ltd.

(57) ABSTRACT

A communication method is provided. The method includes a first terminal device that monitors control information of a first cell in a first time period, and after monitoring the control information, determines, based on the control information, whether to perform monitoring on the first paging occasion. The first time period includes at least one time unit in which a first synchronization signal block burst set is located or the first time period is adjacent to time units in which the first synchronization signal block burst set is located. Additionally, the first synchronization signal block burst set is located in front of the first paging occasion in time domain.

20 Claims, 14 Drawing Sheets

PF: paging frame   PO: paging occasion (a)

(b)

COMMUNICATION METHOD AND APPARATUS

CROSS-REFERENCE TO RELATED APPLICATIONS

This application is a continuation of International Application No. PCT/CN2021/106752, filed on Jul. 16, 2021, which claims priority to Chinese Patent Application No. 202010688212.9, filed on Jul. 16, 2020. The aforementioned applications are incorporated herein by reference in their entireties.

TECHNICAL FIELD

This application relates to the field of communication technologies, and in particular, to a communication method and apparatus.

BACKGROUND

In a wireless communication system, an access network device may send a paging message to a terminal. The access network device sends two types of paging messages. One type is a paging message of a short message type, for example, a system message update indication or an earthquake and tsunami warning system (ETWS) message. A terminal device in an idle state, an inactive state, or a connected state can receive the paging message of the short message type. The other type is a paging message used to establish a connection. A terminal device in an idle state or an inactive state may receive this type of paging message, and a terminal device in a connected state does not need to receive this type of paging message.

For example, for the paging message used to establish a connection, a possible paging process is as follows: After downlink data arrives at a user plane function (UPF) entity, the UPF entity notifies a session management function (SMF) entity that the data arrives, the SMF entity notifies an access and mobility management function (AMF) entity to initiate paging, the AMF entity sends a paging indication to an access network device, and after receiving the paging indication, the access network device sends monitoring downlink control information (DCI) on a paging occasion (PO), where the DCI is used to schedule a paging message. However, because a terminal device does not know the paging occasion on which the access network device sends the DCI, the terminal device needs to perform monitoring on a plurality of paging occasions corresponding to the terminal device. Consequently, relatively high power consumption is caused.

SUMMARY

In view of this, this application provides a communication method and apparatus, to reduce power consumption of a terminal device.

According to a first aspect, an embodiment of this application provides a communication method. The method is applicable to a first terminal device or a chip in the first terminal device. For example, the method is applicable to the first terminal device. In the method, the first terminal device monitors first control information of a first cell in a first time period, where the first control information is used to indicate, to the first terminal device, whether to perform monitoring on a first paging occasion; and after monitoring the first control information, determines, based on the first control information, whether to perform monitoring on the first paging occasion. The first time period includes at least one time unit in which a first synchronization signal block burst set of the first cell is located, or the first time period is adjacent to time units in which the first synchronization signal block burst set is located; and the first synchronization signal block burst set is located in front of the first paging occasion in time domain.

Alternatively, in the method, the first terminal device receives second control information of a first cell in a first time period, where the second control information is used to indicate the first terminal device to perform monitoring on a first paging occasion; and if receiving the second control information, performs monitoring on the first paging occasion based on the second control information; or if receiving no second control information, skips performing monitoring on the first paging occasion. The first time period includes at least one time unit in which a first synchronization signal block burst set of the first cell is located, or the first time period is adjacent to time units in which the first synchronization signal block burst set is located; and the first synchronization signal block burst set is located in front of the first paging occasion in time domain.

In the foregoing method, an access network device may send the first control information to the first terminal device before the first paging occasion. The first control information indicates the first terminal device to perform monitoring (in this case, the first terminal device may be paged) or not to perform monitoring (in this case, the first terminal device is not paged) on the first paging occasion. Further, when the first terminal device determines, based on the first control information, not to perform monitoring on the first paging occasion, the first terminal device may enter a deep sleep state (or a light sleep state), so that the first terminal device can pertinently perform monitoring, thereby effectively reducing power consumption of the first terminal device.

In addition, the first time period includes the at least one time unit in which the first synchronization signal block burst set of the first cell is located, or the first time period is adjacent to the time units in which the first synchronization signal block burst set is located, so that receiving of the first synchronization signal block burst set and monitoring of the first control information can be completed in a very short period of time. In this manner, the first terminal device introduces no additional state switching when monitoring the first control information, so that power consumption overheads caused by the first terminal device are very small.

In a possible design, the first synchronization signal block burst set is any one of last N synchronization signal block burst sets located in front of the first paging occasion, and N is a positive integer.

In a possible design, when the first time period includes the at least one time unit in which the first synchronization signal block burst set is located, start time of the first time period is not earlier than start time of the first time unit in which the first synchronization signal block burst set is located; or when the first time period is adjacent to the time units in which the first synchronization signal block burst set is located, start time of the first time period is end time of the last time unit in which the first synchronization signal block burst set is located.

In a possible design, end time of the first time period is not later than preset time, and the preset time is not later than start time of the first paging occasion.

In a possible design, the first time period is determined based on the time units in which the first synchronization signal block burst set of the first cell is located or a time unit in which at least one SSB in the first synchronization signal block burst set is located.

In a possible design, time information of the first time period is received. The time information of the first time period includes at least one of the following: an offset of the start time of the first time period, duration of the first time period, or an offset of the end time of the first time period. The first time period is determined based on the time units in which the first synchronization signal block burst set of the first cell is located or the time unit in which the at least one SSB in the first synchronization signal block burst set is located, and the time information of the first time period.

In a possible design, the method further includes: receiving first configuration information. The first configuration information is used to configure a plurality of monitoring occasions of the first control information. The monitoring first control information in a first time period includes: monitoring the first control information on a first monitoring occasion that is in the plurality of monitoring occasions and that is located in the first time period.

In a possible design, the first monitoring occasion does not overlap SSBs in the first synchronization signal block burst set in time domain.

In a possible design, the method further includes: receiving second configuration information. The second configuration information is used to configure a control resource set, and the control resource set is used to determine a frequency domain location of the first control information in the first cell. The control resource set meets at least one of the following: a frequency domain resource corresponding to the control resource set falls within a frequency domain range within which the first synchronization signal block burst set falls; or a frequency domain resource corresponding to the control resource set falls within an activated BWP, the activated BWP is an initial BWP or a first BWP, the first BWP is a BWP that is configured by the access network device for the terminal device and that is used in an idle state, and the first BWP is different from the initial BWP.

In a possible design, that the first control information is used to indicate the first terminal device whether to perform monitoring on the first paging occasion includes: the first control information is used to indicate, to terminal devices in a first terminal device group, whether to perform monitoring on the first paging occasion, and the first terminal device belongs to the first terminal device group.

In a possible design, the first control information is further used to indicate whether a first-type reference signal in the first cell is to be sent in a second time period, and the first-type reference signal is used by at least one idle-state or inactive-state terminal including the first terminal device to perform synchronization or measurement. The method further includes: determining, based on the first control information, whether the first-type reference signal is to be sent in the second time period.

In a possible design, start time of the second time period is not earlier than the end time of the first synchronization signal block burst set; and/or end time of the second time period is not later than the start time of the first paging occasion.

In a possible design, the end time of the second time period is not later than start time of a second synchronization signal block burst set, and the second synchronization signal block burst set is a next synchronization signal block burst set of the first synchronization signal block burst set.

In a possible design, the second time period includes a first sub time period and/or a second sub time period. Start time of the first sub time period is not earlier than the end time of the first synchronization signal block burst set, and end time of the first sub time period is not later than second preset time. Start time of the second sub time period is not earlier than third preset time, and end time of the second sub time period is not later than the start time of the first paging occasion.

In a possible design, the second time period includes the first time period, or the start time of the second time period is the end time of the first time period.

According to a second aspect, an embodiment of this application provides a communication method. The method is applicable to an access network device or a chip in the access network device. For example, the method is applicable to the access network device. In the method, the access network device sends first control information of a first cell in a first time period, where the first control information is used to indicate, to a first terminal device, whether to perform monitoring on a first paging occasion; and sends a first message on the first paging occasion, where the first message is used to schedule a paging message. The first time period includes at least one time unit in which a first synchronization signal block burst set of the first cell is located, or the first time period is adjacent to time units in which the first synchronization signal block burst set is located; and the first synchronization signal block burst set is located in front of the first paging occasion in time domain.

Alternatively, in the method, the access network device sends second control information of a first cell in a first time period, where the second control information is used to indicate a first terminal device to perform monitoring on a first paging occasion; and sends a first message on the first paging occasion, where the first message is used to schedule a paging message. The first time period includes at least one time unit in which a first synchronization signal block burst set of the first cell is located, or the first time period is adjacent to time units in which the first synchronization signal block burst set is located; and the first synchronization signal block burst set is located in front of the first paging occasion in time domain.

In a possible design, the first message may be paging DCI.

In a possible design, the first synchronization signal block burst set is any one of last N synchronization signal block burst sets located in front of the first paging occasion, and N is a positive integer.

In a possible design, when the first time period includes the at least one time unit in which the first synchronization signal block burst set is located, start time of the first time period is not earlier than start time of the first time unit in which the first synchronization signal block burst set is located; or when the first time period is adjacent to the time units in which the first synchronization signal block burst set is located, start time of the first time period is end time of the last time unit in which the first synchronization signal block burst set is located.

In a possible design, end time of the first time period is not later than preset time, and the preset time is not later than start time of the first paging occasion.

In a possible design, the method further includes: sending time information of the first time period. The time information of the first time period includes at least one of the following: an offset of the start time of the first time period, duration of the first time period, or an offset of the end time of the first time period.

In a possible design, the method further includes: sending second configuration information. The second configuration information is used to configure a control resource set, and the control resource set is used to determine a frequency domain location of the first control information in the first cell. The control resource set meets at least one of the following: a frequency domain resource corresponding to the control resource set falls within a frequency domain range within which the first synchronization signal block burst set falls; or a frequency domain resource corresponding to the control resource set falls within an activated BWP, the activated BWP is an initial bandwidth part BWP or a first BWP, the first BWP is a BWP that is configured by the access network device for the terminal device and that is used in an idle state, and the first BWP is different from the initial BWP.

In a possible design, that the first control information is used to indicate the first terminal device whether to perform monitoring on the first paging occasion includes: the first control information is used to indicate, to terminal devices in a first terminal device group, whether to perform monitoring on the first paging occasion, and the first terminal device belongs to the first terminal device group.

In a possible design, the first control information is further used to indicate whether the access network device is to send a first-type reference signal of the first cell in a second time period (or the first control information is further used to indicate whether the first-type reference signal of the first cell is to be sent in the second time period), and the first-type reference signal is used by at least one idle-state or inactive-state terminal including the first terminal device to perform synchronization or measurement. When the control information is further used to indicate that the access network device is to send the first-type reference signal of the first cell in the second time period, the method further includes: sending the first-type reference signal in the second time period.

In a possible design, start time of the second time period is not earlier than the end time of the first synchronization signal block burst set; and/or end time of the second time period is not later than the start time of the first paging occasion.

In a possible design, the end time of the second time period is not later than start time of a second synchronization signal block burst set, and the second synchronization signal block burst set is a next synchronization signal block burst set of the first synchronization signal block burst set.

In a possible design, the second time period includes a first sub time period and/or a second sub time period. Start time of the first sub time period is not earlier than the end time of the first synchronization signal block burst set, and end time of the first sub time period is not later than second preset time. Start time of the second sub time period is not earlier than third preset time, and end time of the second sub time period is not later than the start time of the first paging occasion.

In a possible design, the second time period includes the first time period, or the start time of the second time period is the end time of the first time period.

It should be noted that the method described in the second aspect corresponds to the method described in the first aspect. For beneficial effects of related technical features in the method described in the second aspect, refer to the description in the first aspect. Details are not described again.

According to a third aspect, an embodiment of this application provides a communication apparatus. The communication apparatus may be a terminal device or a chip disposed inside the terminal device. The communication apparatus has a function of implementing the first aspect. For example, the communication apparatus includes modules, units, or means corresponding to execution of the steps in the first aspect. The function, units, or means may be implemented by using software, may be implemented by using hardware, or may be implemented by executing corresponding software by using hardware.

In a possible design, the communication apparatus includes a processing unit and a communication unit. The communication unit may be configured to send/receive a signal, to implement communication between the communication apparatus and another apparatus. For example, the communication unit is configured to receive configuration information from a access network device. The processing unit may be configured to perform some internal operations of the communication apparatus. Functions performed by the processing unit and the communication unit may correspond to the operations in the first aspect.

In a possible design, the communication apparatus includes a processor, and may further include a transceiver. The transceiver is configured to send/receive a signal. The processor executes program instructions to complete the method according to any one of the first aspect and the possible designs or implementations in the first aspect. The communication apparatus may further include one or more memories. The memory is configured to be coupled to the processor, and the memory may store a necessary computer program or necessary instructions for implementing the functions in the first aspect. The processor may execute the computer program or instructions stored in the memory. When the computer program is executed or the instructions are executed, the communication apparatus is enabled to implement the method according to any one of the first aspect and the possible designs or implementations in the first aspect.

In a possible design, the communication apparatus includes a processor. The processor may be configured to be coupled to a memory. The memory may store a necessary computer program or necessary instructions for implementing the functions in the first aspect. The processor may execute the computer program or instructions stored in the memory. When the computer program is executed or the instructions are executed, the communication apparatus is enabled to implement the method according to any one of the first aspect and the possible designs or implementations in the first aspect.

In a possible design, the communication apparatus includes a processor and an interface circuit. The processor is configured to communicate with another apparatus by using the interface circuit, and perform the method according to any one of the first aspect and the possible designs or implementations in the first aspect.

According to a fourth aspect, an embodiment of this application provides a communication apparatus. The communication apparatus may be an access network device or a chip disposed inside the access network device. The communication apparatus has a function of implementing the second aspect. For example, the communication apparatus includes modules, units, or means corresponding to execution of the steps in the second aspect. The modules, units, or means may be implemented by using software, may be implemented by using hardware, or may be implemented by executing corresponding software by using hardware.

In a possible design, the communication apparatus includes a processing unit and a communication unit. The communication unit may be configured to send/receive a signal, to implement communication between the communication apparatus and another apparatus. For example, the communication unit is configured to receive configuration information from a terminal device. The processing unit may be configured to perform some internal operations of the communication apparatus. Functions performed by the processing unit and the communication unit may correspond to the operations in the second aspect.

In a possible design, the communication apparatus includes a processor. The processor may be configured to be coupled to a memory. The memory may store a necessary computer program or necessary instructions for implementing the functions in the second aspect. The processor may execute the computer program or instructions stored in the memory. When the computer program is executed or the instructions are executed, the communication apparatus is enabled to implement the method according to any one of the second aspect and the possible designs or implementations in the second aspect.

In a possible design, the communication apparatus includes a processor. The processor may be configured to be coupled to a memory. The memory may store a necessary computer program or necessary instructions for implementing the functions in the second aspect. The processor may execute the computer program or instructions stored in the memory. When the computer program is executed or the instructions are executed, the communication apparatus is enabled to implement the method according to any one of the second aspect and the possible designs or implementations in the second aspect.

In a possible design, the communication apparatus includes a processor and an interface circuit. The processor is configured to communicate with another apparatus by using the interface circuit, and perform the method according to any one of the second aspect and the possible designs or implementations in the second aspect.

It may be understood that, in the third aspect or the fourth aspect, the processor may be implemented by using hardware, or may be implemented by using software. When being implemented by using hardware, the processor may be a logic circuit, an integrated circuit, or the like. When being implemented by using software, the processor may be a general purpose processor, and is implemented by reading software code stored in the memory. In addition, in the foregoing, there may be one or more processors and one or more memories. The memory may be integrated with the processor, or the memory may be disposed separately from the processor. In a specific implementation process, the memory and the processor may be integrated onto a same chip, or may be separately disposed on different chips. A type of the memory and a disposition manner of the memory and the processor are not limited in this embodiment of this application.

According to a fifth aspect, an embodiment of this application provides a communication system. The communication system includes the communication apparatus according to the third aspect and the communication apparatus according to the fourth aspect.

According to a sixth aspect, this application provides a computer-readable storage medium. The computer storage medium stores computer-readable instructions. When a computer reads and executes the computer-readable instructions, the computer is enabled to perform the method according to any one of the first aspect and the possible designs of the first aspect or any one of the second aspect and the possible designs of the second aspect.

According to a seventh aspect, this application provides a computer program product. When a computer reads and executes the computer program product, the computer is enabled to perform the method according to any one of the first aspect and the possible designs of the first aspect or any one of the second aspect and the possible designs of the second aspect.

According to an eighth aspect, this application provides a chip. The chip includes a processor. The processor is coupled to a memory to read and execute a software program stored in the memory, to implement the method according to any one of the first aspect and the possible designs of the first aspect or any one of the second aspect and the possible designs of the second aspect.

These aspects or other aspects of this application are clearer and more comprehensible in descriptions of the following embodiments.

DESCRIPTION OF EMBODIMENTS

Figure 1:
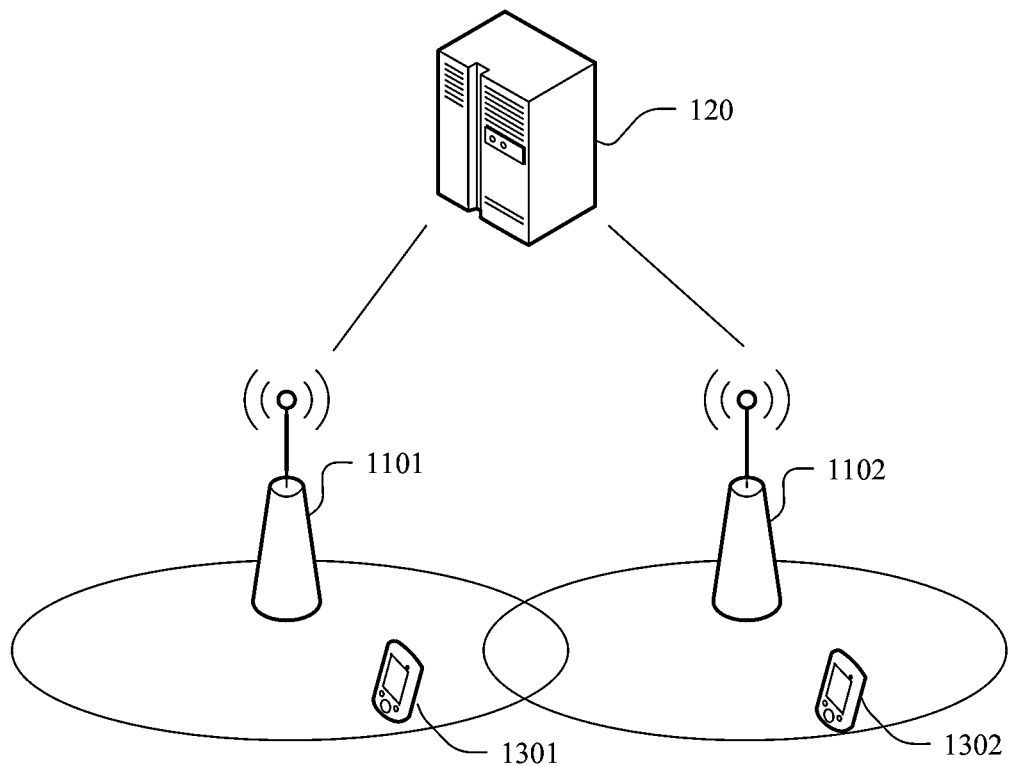
FIG. 1 is a schematic diagram of a network architecture to which an embodiment of this application is applicable.

The following clearly describes the technical solutions in embodiments of this application with reference to the accompanying drawings in embodiments of this application.

Some terms of embodiments of this application are first described, to facilitate understanding of a person skilled in the art.

(1) Terminal device: The terminal device may be a wireless terminal device that can receive scheduling and indication information from an access network device. The wireless terminal device may be a device that provides a user with voice and/or data connectivity, a handheld device with a wireless connection function, or another processing device connected to a wireless modem. The terminal device may communicate with one or more core networks or the Internet by using a radio access network (RAN). The terminal device may be a mobile terminal device, such as a mobile telephone (also referred to as a "cellular" phone or a mobile phone), a computer, or a data card. For example, the terminal device may be a portable, pocket-sized, handheld, computer built-in, or vehicle-mounted mobile apparatus that exchanges voice and/or data with the radio access network. For example, the terminal device may be a device such as a personal communication service (PCS) phone, a cordless phone, a session initiation protocol (SIP) phone, a wireless local loop (WLL) station, a personal digital assistant (PDA), a tablet computer (Pad), or a computer having a wireless transceiver function. The wireless terminal device may also be referred to as a system, a subscriber unit, a subscriber station, a mobile station, a mobile station (MS), a remote station, an access point (AP), a remote terminal device, an access terminal device, a user terminal device, a user agent, a subscriber station (SS), customer premises equipment (CPE), a terminal, user equipment (UE), a mobile terminal (MT), or the like. The terminal device may be alternatively a wearable device, or a terminal device in a next-generation communication system such as a 5G communication system or a terminal device in a future evolved public land mobile network (PLMN).

(2) Access network device: The access network device may be a device in a wireless network, for example, the access network device may be a radio access network (RAN) node (or device) that enables a terminal device to access the wireless network; and may also be referred to as a base station. Currently, some examples of the RAN device are as follows: a next generation NodeB (gNodeB) in a 5G communication system, a transmission reception point (TRP), an evolved NodeB (eNB), a radio network controller (RNC), a NodeB (NB), a base station controller (BSC), a base transceiver station (BTS), a home base station (for example, a home evolved NodeB or a home NodeB, HNB), a baseband unit (BBU), and a wireless fidelity (Wi-Fi) access point (AP). In addition, in a network structure, the access network device may include a centralized unit (CU) node, a distributed unit (DU) node, or a RAN device including a CU node and a DU node. In addition, in another possible case, the access network device may be another apparatus that provides the terminal device with a wireless communication function. A specific technology and a specific device form used by the access network device are not limited in the embodiments of this application. For ease of description, in the embodiments of this application, an apparatus that provides a terminal device with a wireless communication function is referred to as an access network device.

(3) The terms "system" and "network" may be used interchangeably in embodiments of this application. "At least one" means one or more, and "a plurality of" means two or more. The term "and/or" describes an association relationship for describing associated objects and represents that three relationships may exist. For example, A and/or B may represent the following cases: Only A exists, both A and B exist, and only B exists, where A and B may be singular or plural. The character "/" generally indicates an "or" relationship between the associated objects. At least one of the following items (pieces) or a similar expression thereof indicates any combination of these items, including a single item (piece) or any combination of a plurality of items (pieces). For example, "at least one of A, B, and C" includes A, B, C, AB, AC, BC, or ABC. In addition, unless otherwise stated, ordinal numbers such as "first" and "second" in embodiments of this application are used to distinguish between a plurality of objects, and are not used to limit an order, a time sequence, priorities, or importance of the plurality of objects.

FIG. 1 is a schematic diagram of a network architecture to which an embodiment of this application is applicable. As shown in FIG. 1, a terminal device may access a wireless network, to obtain a service from an external network (for example, the Internet) by using the wireless network, or communicate with another device by using the wireless network, for example, may communicate with another terminal device. The wireless network includes a RAN and a core network (CN). The RAN is configured to enable the terminal device (for example, a terminal device 1301 or a terminal device 1302) to access the wireless network, and the CN is configured to manage the terminal device and provide a gateway for communicating with the external network.

The RAN may include one or more RAN devices, such as a RAN device 1101 and a RAN device 1102.

The CN may include one or more CN devices, such as a CN device 120. When the network architecture shown in FIG. 1 is applicable to a 5G communication system, the CN device 120 may include an AMF entity, an SMF entity, a UPF entity, and the like.

It should be understood that quantities of devices in the communication system shown in FIG. 1 are merely an example. This embodiment of this application is not limited thereto. In actual application, the communication system may alternatively include more terminal devices, more RAN devices, or other devices.

Figure 2:
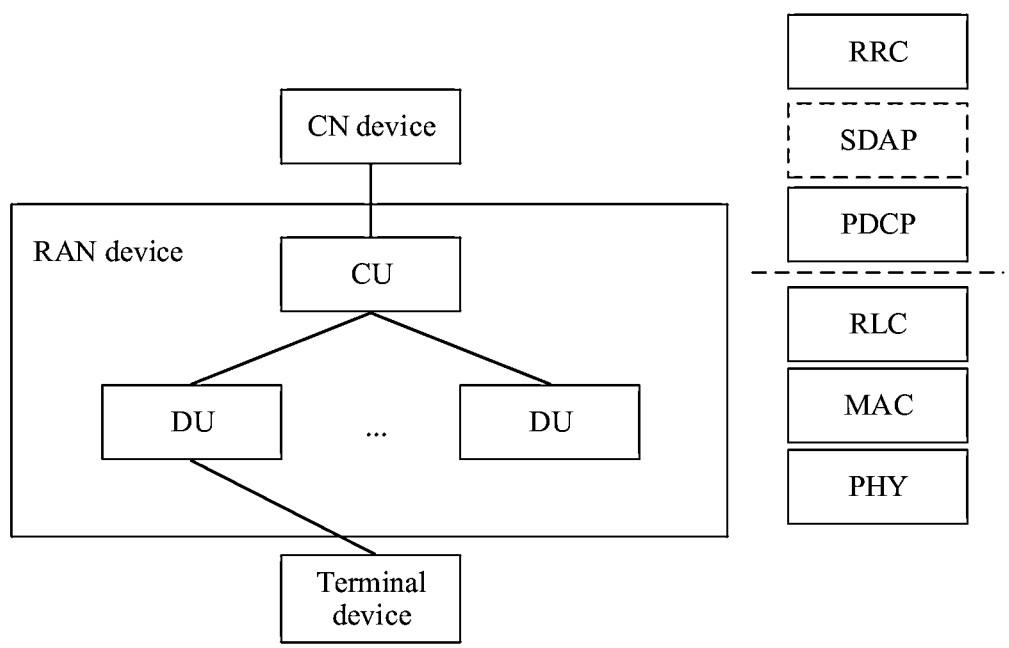
FIG. 2 is a schematic diagram of another network architecture to which an embodiment of this application is applicable.

FIG. 2 is a schematic diagram of another network architecture to which an embodiment of this application is applicable. As shown in FIG. 2, the network architecture includes a CN device, a RAN device, and a terminal device. The RAN device includes a baseband apparatus and a radio frequency apparatus. The baseband apparatus may be implemented by one node, or may be implemented by a plurality of nodes. The radio frequency apparatus may be independently implemented by being disposed remotely from the baseband apparatus, or may be integrated into the baseband apparatus. Alternatively, some functions of the radio frequency apparatus are independently integrated, and some functions of the radio frequency apparatus are integrated into the baseband apparatus. For example, in an LTE communication system, a RAN device includes a baseband apparatus and a radio frequency apparatus. The radio frequency apparatus may be disposed remotely from the baseband apparatus. For example, a remote radio unit (RRU) is a remote radio unit disposed relative to a BBU.

Communication between the RAN device and the terminal device follows a specific protocol layer structure. For example, a control plane protocol layer structure may include functions of protocol layers such as a radio resource control (RRC) layer, a packet data convergence protocol (PDCP) layer, a radio link control (RLC) layer, a media access control (MAC) layer, and a physical layer. A user plane protocol layer structure may include functions of protocol layers such as the PDCP layer, the RLC layer, the MAC layer, and the physical layer. In a possible implementation, a service data adaptation protocol (SDAP) layer may be further included above the PDCP layer.

The RAN device may implement functions of protocol layers such as an RRC layer, a PDCP layer, an RLC layer, and a MAC layer by using one node, or may implement the functions of these protocol layers by using a plurality of nodes. For example, in an evolved structure, the RAN device may include a CU and DUs, and a plurality of DUs may be centrally controlled by one CU. As shown in FIG. 2, for the CU and the DU, division may be performed based on a protocol layer of a wireless network. For example, functions of a PDCP layer and a protocol layer above the PDCP layer are set in the CU, and functions of protocol layers below the PDCP layer, such as an RLC layer and a MAC layer, are set in the DU.

This protocol layer division is only an example. Alternatively, division may be performed based on another protocol layer. For example, division is performed based on the RLC layer. Functions of the RLC layer and a protocol layer above the RLC layer are set in the CU, and functions of protocol layers below the RLC layer are set in the DU. Alternatively, division is performed in a protocol layer. For example, some functions of the RLC layer and functions of protocol layers above the RLC layer are set in the CU, and remaining functions of the RLC layer and functions of protocol layers below the RLC layer are set in the DU. In addition, division may alternatively be performed in another manner. For example, division is performed based on a latency. A function whose processing time needs to satisfy a latency requirement is set on the DU, and a function whose processing time does not need to satisfy the latency requirement is set on the CU.

In addition, the radio frequency apparatus may be not placed in the DU but is integrated independently, or may be integrated into the DU, or a part is placed remotely from the DU and a remaining part is integrated into the DU. This is not limited herein.

Figure 3:
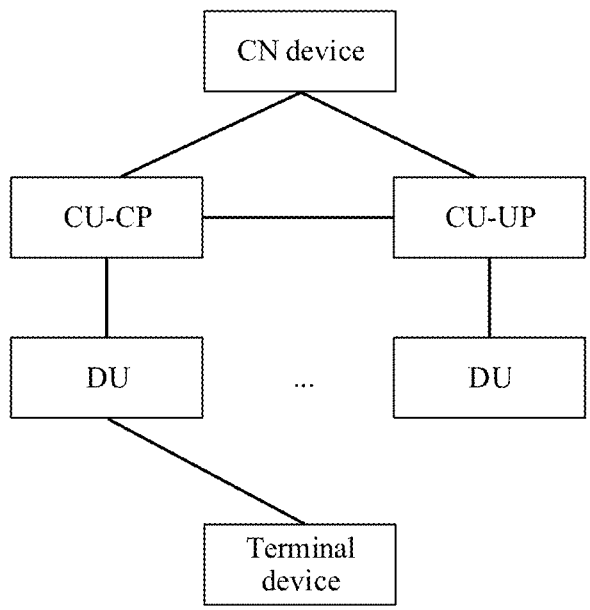
FIG. 3 is a schematic diagram of another network architecture to which an embodiment of this application is applicable.

FIG. 3 is a schematic diagram of another network architecture to which an embodiment of this application is applicable. Compared with the network architecture shown in FIG. 2, in FIG. 3, a control plane (CP) and a user plane (UP) of a CU may be further separated as different entities for implementation: a control plane CU entity (a CU-CP entity) and a user plane CU entity (a CU-UP entity).

In the foregoing network architecture, signaling generated by the CU may be sent to the terminal device by using the DU, or signaling generated by the terminal device may be sent to the CU by using the DU. The DU may directly encapsulate the signaling by using a protocol layer without parsing the signaling, and then transparently transmit the signaling to the terminal device or the CU. If the following embodiments relate to this transmission of signaling between the DU and the terminal device, in this case, sending or receiving of the DU for the signaling includes this scenario. For example, signaling of the RRC or PDCP layer is finally processed as signaling of the PHY layer, to be sent to the terminal device, or is converted from received signaling of the PHY layer. In this architecture, the signaling of the RRC or PDCP layer may also be considered as being sent by the DU, or sent by the DU and a radio frequency apparatus.

The network architecture shown in FIG. 1, FIG. 2, or FIG. 3 is applicable to communication systems of various radio access technologies (RAT). For example, the communication system may be a 4G (also referred to as long term evolution (LTE)) communication system, may be a 5G (also referred to as new radio (NR)) communication system, or may be a transition system between the LTE communication system and the 5G communication system. The transition system may also be referred to as a 4.5G communication system. Certainly, the communication system may be alternatively a future communication system. A network architecture and a service scenario described in embodiments of this application are intended to describe the technical solution in embodiments of this application more clearly, and do not constitute a limitation on the technical solution provided in embodiments of this application. A person of ordinary skill in the art may know that with evolution of communication network architectures and emergence of new service scenarios, the technical solution provided in embodiments of this application is also applicable to similar technical problems.

An apparatus in the following embodiments of this application may be located in a terminal device or an access network device based on a function implemented by the apparatus. When the foregoing CU-DU structure is used, an access network device may be a CU, a DU, or a RAN device that includes a CU and a DU.

The following first describes related technical features in the embodiments of this application. It should be noted that these explanations are intended to facilitate understanding of the embodiments of this application, and should not be considered as a limitation on the required protection scope of this application.

I. SSB

A terminal device may receive an SSB from an access network device to implement time-frequency synchronization with the access network device. In addition, the terminal device may further perform system message demodulation and the like based on the SSB. Herein, related technical features related to the SSB are described with reference to FIG. 4a to FIG. 4g.

(1) Composition of the SSB

Figure 4A:
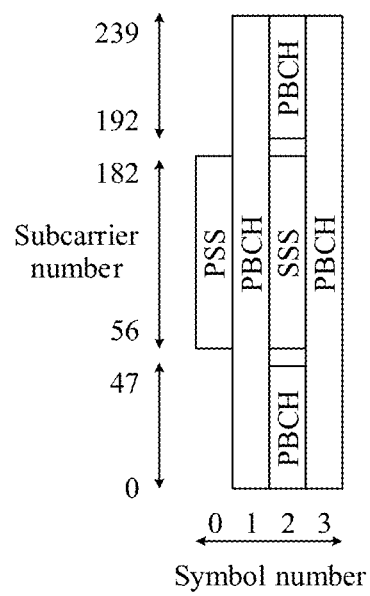
FIG. 4a is a schematic diagram of an SSB according to an embodiment of this application.

In this embodiment of this application, a primary synchronization signal (PSS), a secondary synchronization signal (SSS), and a PBCH form an SSB together. As shown in FIG. 4a, in time domain, one SSB occupies four symbols: a symbol 0 to a symbol 3. In frequency domain, one SSB occupies 20 resource blocks (RB) (one RB includes 12 subcarriers), namely, 240 subcarriers, and subcarrier numbers are 0 to 239. A PSS is located on 127 subcarriers in the middle of the symbol 0, and an SSS is located on 127 subcarriers in the middle of the symbol 2. To protect the PSS and the SSS, there are separately different guard subcarriers. The guard subcarrier is not used to carry a signal. Subcarriers are separately reserved on two sides of the SSS as guard subcarriers. For example, blank areas on the two sides of the SSS in FIG. 4a are guard subcarriers. A PBCH occupies all subcarriers of the symbol 1 and the symbol 3, and occupies some subcarriers in remaining subcarriers other than the subcarriers occupied by the SSS in all subcarriers of the symbol 2 (subcarriers other than the guard subcarriers in the remaining subcarriers).

The PSS may be used to transmit a cell identity, and the SSS may be used to transmit a cell group identity. The cell identity and the cell group identity jointly determine a plurality of physical cell identities (PCI) in a 5G communication system. Once the terminal device successfully finds the PSS and the SSS, the terminal device knows a physical cell identity of this 5G carrier, and therefore has a capability of parsing a system message included in the SSB.

The system message in the SSB is carried on the PBCH. The information is information necessary for accessing a network by the terminal device, and therefore may be referred to as a main information block (MIB). The MIB may include a system frame number, an initial-access subcarrier spacing, and other information.

Because the MIB includes limited information, it is not enough to support the terminal device in accessing a 5G cell. Therefore, the terminal device further needs to obtain some necessary system messages, such as a system information block (SIB) 1. The SIB 1 is transmitted on a physical downlink shared channel (PDSCH). Because the terminal device obtains, from the MIB carried on the PBCH, a parameter used to transmit the SIB 1 and a distribution status of a control resource for scheduling the SIB 1, the terminal device can receive the SIB 1. In this way, the terminal device can obtain system messages necessary for accessing the 5G cell, and subsequently can access the 5G cell after being paged.

(2) Sending Mechanism of the SSB

Figure 4B:
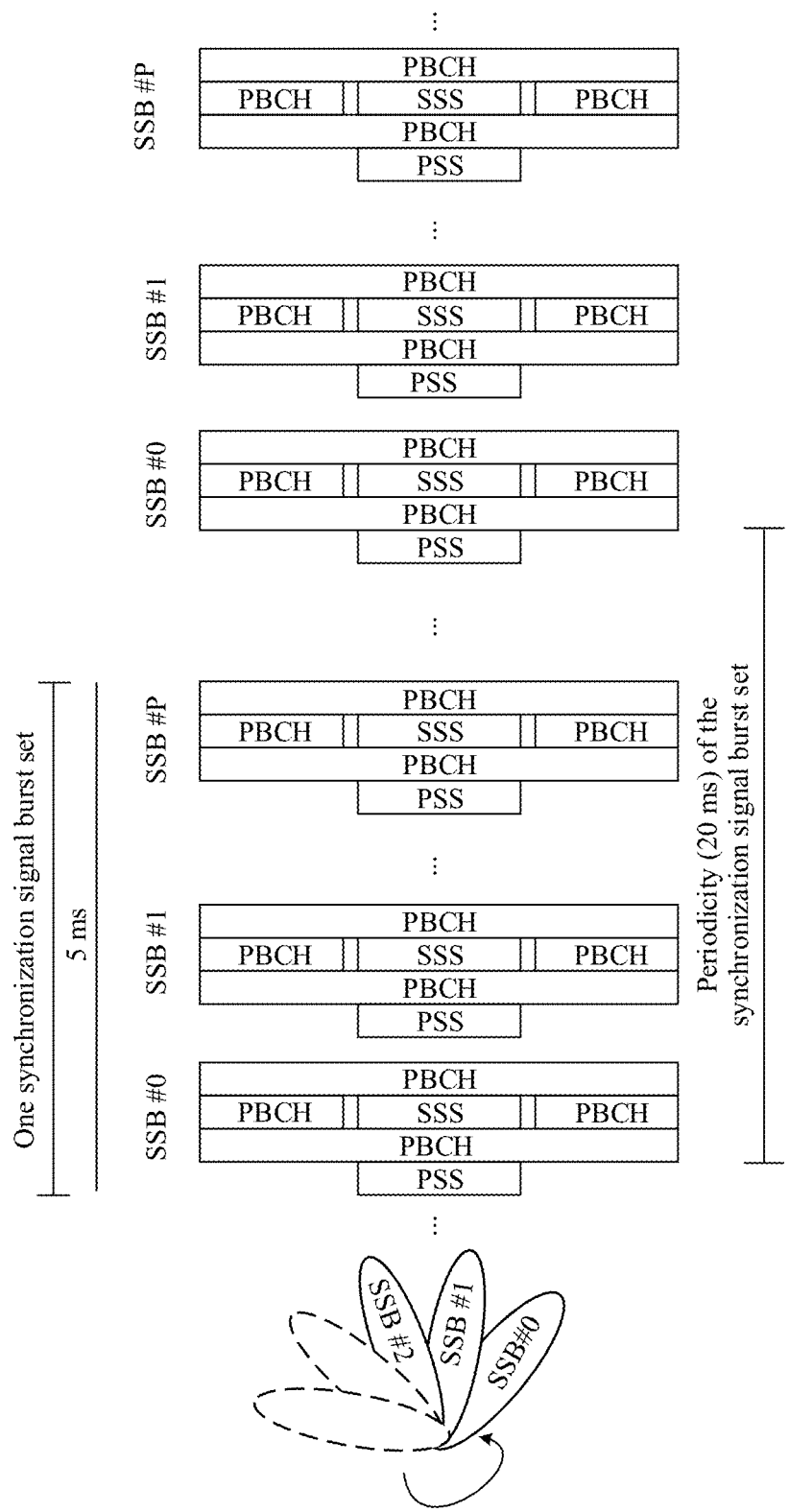
FIG. 4b is a schematic diagram of a synchronization burst set according to an embodiment of this application.

In the 5G communication system, for a cell (or a carrier), the access network device may send SSBs at different moments by using one frequency and different beams, to complete broadcast beam coverage of the cell, as shown in FIG. 4b.

A set of SSBs sent by the access network device in one time of beam scanning process may be referred to as an SS burst set. A cycle of the SS burst set is equivalent to a cycle of an SSB corresponding to a specific beam, and may be configured as 5 ms (milliseconds), 10 ms, 20 ms, 40 ms, 80 ms, 160 ms, or the like. When performing cell searching, the terminal device cannot wait for excessively long time on a frequency. Therefore, the terminal device performs cell searching based on 20 ms by default.

Currently, one SS burst set cycle has a maximum of four, eight, or 64 SSBs. When a carrier frequency band is less than or equal to 3 GHz, one SS burst set cycle has a maximum of four SSBs. Each SS burst set always falls within a time interval of 5 ms. For a schematic diagram of the SS burst set, refer to FIG. 4b. FIG. 4b shows an example in which the cycle of the SS burst set is 20 ms and one SS burst set includes P SSBs.

(3) Time-Frequency Location of the SSB

A time domain location of the SSB may be specified by a protocol, and the protocol specifies relationships between different subcarrier spacings (SCS) and time domain patterns of the SSB. FIG. 4c, FIG. 4d, FIG. 4e, FIG. 4f, and FIG. 4g respectively represent time domain patterns of the SSB.

Figure 4C:
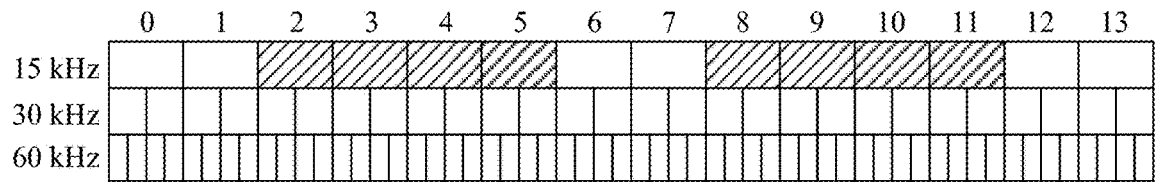
FIG. 4c to FIG. 4g each are a schematic diagram of a time domain pattern of an SSB according to an embodiment of this application.

FIG. 4c represents a time domain pattern of SSBs included in one slot when a subcarrier spacing is 15 kHz. It may be learned that one slot includes two SSBs. A box with slashes in FIG. 4c represents an OFDM symbol occupied by the SSB.

Figure 4D:
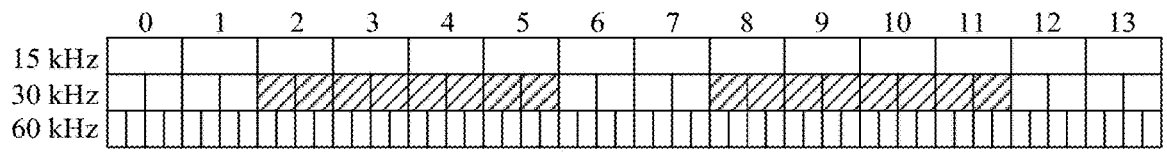

FIG. 4d represents a time domain pattern of SSBs included in one slot when a subcarrier spacing is 30 kHz. It may be learned that one slot includes two SSBs. A box with slashes in FIG. 4d represents an OFDM symbol occupied by the SSB.

Figure 4E:
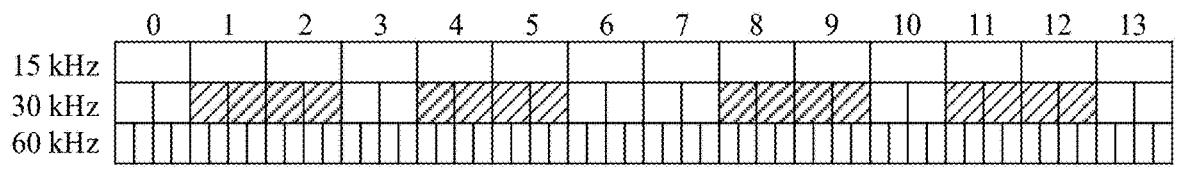

FIG. 4e represents another time domain pattern of SSBs included in one slot when a subcarrier spacing is 30 kHz. It may be learned that one slot includes two SSBs. A box with slashes in FIG. 4e represents an OFDM symbol occupied by the SSB.

Figure 4F:
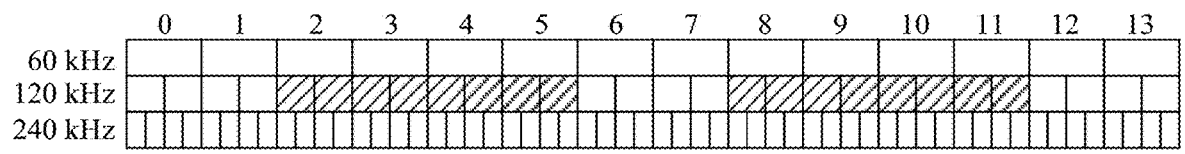

FIG. 4f represents a time domain pattern of SSBs included in one slot when a subcarrier spacing is 120 kHz. It may be learned that one slot includes four SSBs. A box with slashes in FIG. 4f represents an OFDM symbol occupied by the SSB.

Figure 4G:
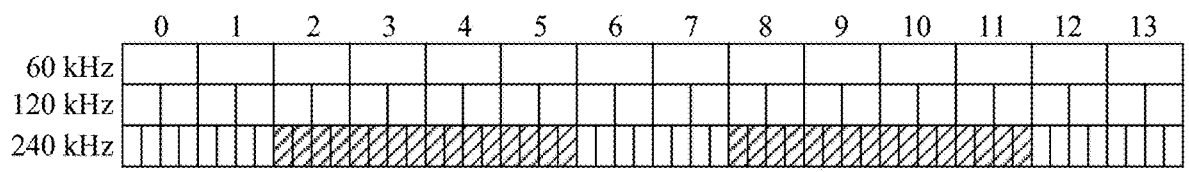

FIG. 4g represents a time domain pattern of SSBs included in one slot when a subcarrier spacing is 240 kHz. It may be learned that one slot includes eight SSBs. A box with slashes in FIG. 4g represents an OFDM symbol occupied by the SSB.

II. Paging

In a wireless communication system, an access network device sends paging messages to a terminal based on different service requirements. For example, the access network device may send a paging message (which may also be referred to as a short message) of a short message type to the terminal device. For another example, the access network device may send, to the terminal device, a paging message used to establish a connection. The embodiments of this application mainly provide descriptions by using an example in which a paging message is a paging message used to establish a connection.

Figure 5:
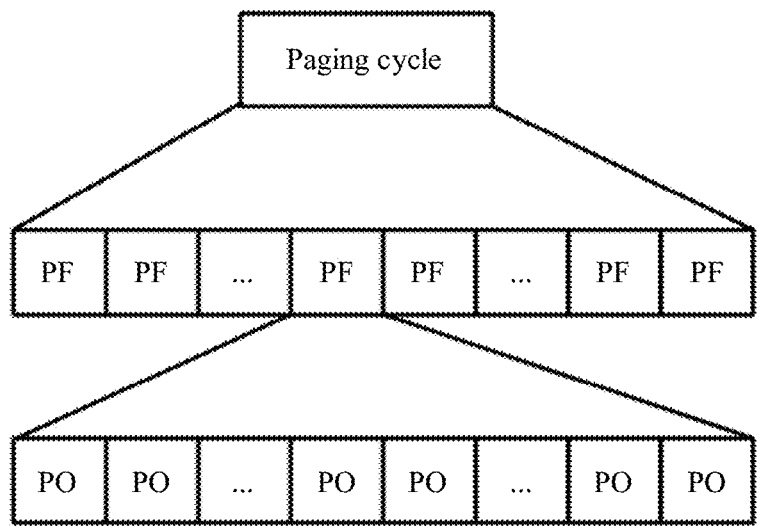
FIG. 5 is a schematic diagram of a paging frame and a paging occasion according to an embodiment of this application.

The following describes the paging message. The access network device may periodically send a paging message. As shown in FIG. 5, one paging cycle may have a plurality of paging frames (PF), and each PF may have a plurality of paging occasions. A terminal device 1 is used as an example. Both the access network device and the terminal device 1 may determine, based on an identifier of the terminal device 1, paging occasions corresponding to the terminal device 1. Each paging occasion further includes a plurality of monitoring occasions. Then, the access network device may send DCI (paging DCI, where the paging DCI is used to schedule a paging message, and the paging message is carried on a paging PDSCH) on a monitoring occasion of a paging occasion corresponding to the terminal device 1, and send the paging message on a time-frequency resource indicated by the DCI. The DCI is scrambled by using a paging radio network temporary identity (P-RNTI). Correspondingly, the terminal device 1 may monitor the DCI on a plurality of monitoring occasions of the paging occasion corresponding to the terminal device 1 by using the P-RNTI, and receive the paging message based on the received DCI, to obtain specific content of the paging message.

For example, the paging message may include a paging record list (PagingRecordlist), and the paging record list includes identifiers of one or more terminal devices. After a terminal device in an idle state or an inactive state (for example, the terminal device 1) receives the paging message, if determining that the paging record list includes the identifier of the terminal device 1 (indicating that the paging message is used to page the terminal device 1), the terminal device may initiate a random access process to the access network device; or if determining that the paging record list includes no identifier of the terminal device 1 (indicating that the paging message is not used to page the terminal device 1), the terminal device may continue to perform monitoring or sleep on the paging occasion.

III. Time Unit

The time unit may be understood as a division granularity in time domain. For example, the time unit may be any one of a radio frame, a subframe, a slot, a mini-slot, or a symbol. This is not specifically limited.

Based on the foregoing description of the related technical features, in the network architecture shown in FIG. 1, FIG. 2, or FIG. 3, when being in an idle state or an inactive state, a terminal device usually shuts down a receiver and is in a low power consumption state. Considering that an access network device sends a paging message to the terminal device, to receive the paging message sent by the access network device, the terminal device wakes up from a low power consumption mode every a period of time, and performs monitoring on a plurality of determined paging occasions.

Further, to ensure receiving performance, before performing monitoring on a paging occasion, the terminal device needs to adjust some parameters of the receiver. For example, due to a limitation of manufacturing costs, crystal oscillation occurs in a frequency used by the terminal device and then drift occurs. As a result, after the terminal device runs for a period of time, deviations occur between time and an operating frequency that are maintained by the terminal device and a clock and a frequency of a network. Therefore, the terminal device needs to receive a specific reference signal sent by the access network device, to estimate a current timing deviation, frequency deviation, and the like between the terminal device and the access network device, and compensate for a time-frequency deviation of the terminal device. For a terminal device in an idle state or an inactive state, the specific reference signal may be a synchronization signal and physical broadcast channel (PBCH) block (SSB). For another example, the terminal device further needs to perform automatic gain control (AGC), that is, receive a specific reference signal (for example, an SSB) sent by the access network device, and adjust signal output power of a baseband and a radio frequency circuit based on reference signal received power. It should be noted that the terminal device may further need to perform another operation, such as signal to interference plus noise ratio (signal to interference plus noise ratio) estimation, and beam measurement. This is not specifically limited.

The performing monitoring on a paging occasion means monitoring, on a monitoring occasion corresponding to the paging occasion, DCI scrambled by using a specific RNTI (for example, a P-RNTI). The DCI is used to schedule a PDSCH carrying a paging message.

Figure 6:
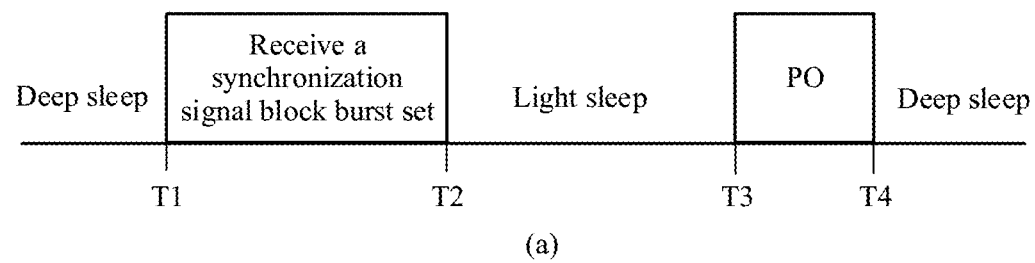
FIG. 6 is a schematic diagram of a related process for a paging occasion according to an embodiment of this application.
Figure 6:
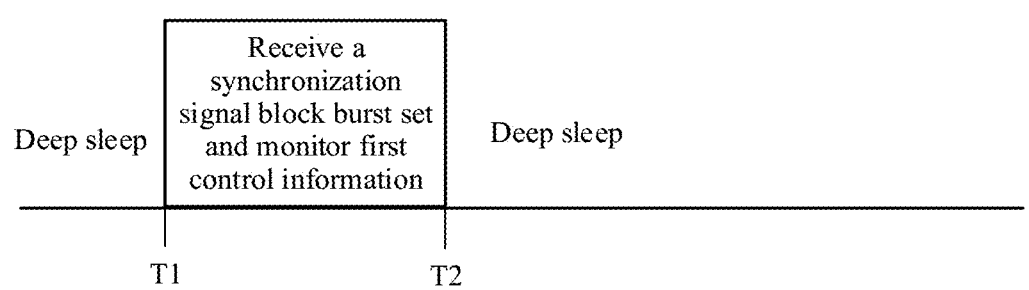

(a) in FIG. 6 shows an example of a process in which a terminal device wakes up and performs monitoring on a paging occasion. As shown in FIG. 6, at a moment T1, the terminal device wakes up from a deep sleep state, and starts to receive SSBs in a synchronization signal burst set (SS burst set). Because there is a specific time interval between the SSBs and a paging occasion in time domain, after receiving the SSBs, the terminal device may switch to a light sleep state at a moment T2. At a moment T3, the terminal device may wake up from the light sleep state and start to perform monitoring on the paging occasion. At a moment T4, after the terminal device finishes monitoring on the paging occasion, if determining that the terminal device is not paged by the access network device, the terminal device may switch to the deep sleep state. Usually, state switching from a sleep state to a wake-up state is accompanied with power consumption overheads. In addition, the sleep state is also accompanied with power consumption, and power consumption of the light sleep state is higher than power consumption of the deep sleep state.

It can be learned from the foregoing process that the terminal device needs to first wake up and receive the SSBs, and experience state switching of the sleep state; and after entering light sleep after a period of time, the terminal device performs monitoring on the paging occasion. Therefore, additional power consumption overheads are caused. Considering that a probability that the terminal device is paged is usually relatively low, it is usually unnecessary to wake up on the PO. However, in an existing mechanism, only after monitoring paging DCI (the DCI is used to schedule a PDSCH) and a paging PDSCH (a PDSCH scheduled by using the paging DCI) on a PO, a terminal device can determine whether the terminal device is paged in this paging cycle. In this case, the terminal device has already consumed power to monitor the paging DCI and receive the paging PDSCH, and consumes additional power for a light sleep state and state switching before the PO.

It should be noted that, in this embodiment of this application, the deep sleep, the light sleep, and micro-sleep (refer to the following) correspond to different sleep levels. The deep sleep corresponds to lowest power consumption, but time for switching from the deep sleep to a normal receiving state is longer, and a power loss caused by the state switching is greater. Power consumption of the light sleep is higher than the power consumption of the deep sleep, but is lower than power consumption of the receiving state. Time required for state switching from the light sleep to the receiving state is shorter than the time required for the state switching from the deep sleep to the receiving state, and a power loss caused by the state switching is also smaller. Power consumption of the micro-sleep is higher than the power consumption of the light sleep, but is lower than the power consumption of the receiving state. Time required for state switching from the micro-sleep to the receiving state is shorter than the time required for the state switching from the light sleep to the receiving state, and a power loss caused by the state switching is also smaller.

Without loss of generality, this application does not depend on a specific sleep manner. In this application, a sleep state is a state in which a terminal device or a chip shuts down some or all modules to reduce power consumption. The deep sleep, the light sleep, and the micro-sleep correspond to quantities of shut-down modules. A larger quantity of shut-down modules indicates a deeper sleep degree and corresponds to lower power consumption. However, time required for switching to the normal receiving state is longer, and additional power consumption overheads caused by the state switching is higher. In this application, the micro-sleep, the light sleep, and the deep sleep are merely used as an example. This application does not exclude a case in which there is only one sleep state or more sleep states.

Based on this, in the embodiments of this application, some possible implementations are studied for a manner of reducing power consumption of a terminal device.

The following describes in detail a communication method provided in the embodiments of this application.

In the following description process, for example, the method is applied to the system architecture shown in FIG. 1. In addition, the method may be performed by two communication apparatuses. The two communication apparatuses are, for example, a first communication apparatus and a second communication apparatus. The first communication apparatus may be an access network device or a communication apparatus that can support the access network device in performing a required function for implementing the method, and certainly may be alternatively another communication apparatus, such as a chip or a chip system. The second communication apparatus may be a terminal device or a communication apparatus that can support the terminal device in performing a required function for implementing the method, and certainly may be alternatively another communication apparatus, such as a chip or a chip system. For ease of description, in the following, for example, the method is performed by an access network device and a terminal device; in other words, for example, the first communication apparatus is an access network device and the second communication apparatus is a terminal device. If the embodiments are applied to the system architecture shown in FIG. 1, the following access network device configured to perform the embodiment shown in FIG. 7 may be the access network device 1101 in the system architecture shown in FIG. 1, and the following terminal device (for example, a first terminal device) configured to perform the embodiment shown in FIG. 7 may be the terminal device 1301 in the system architecture shown in FIG. 1.

Figure 7:
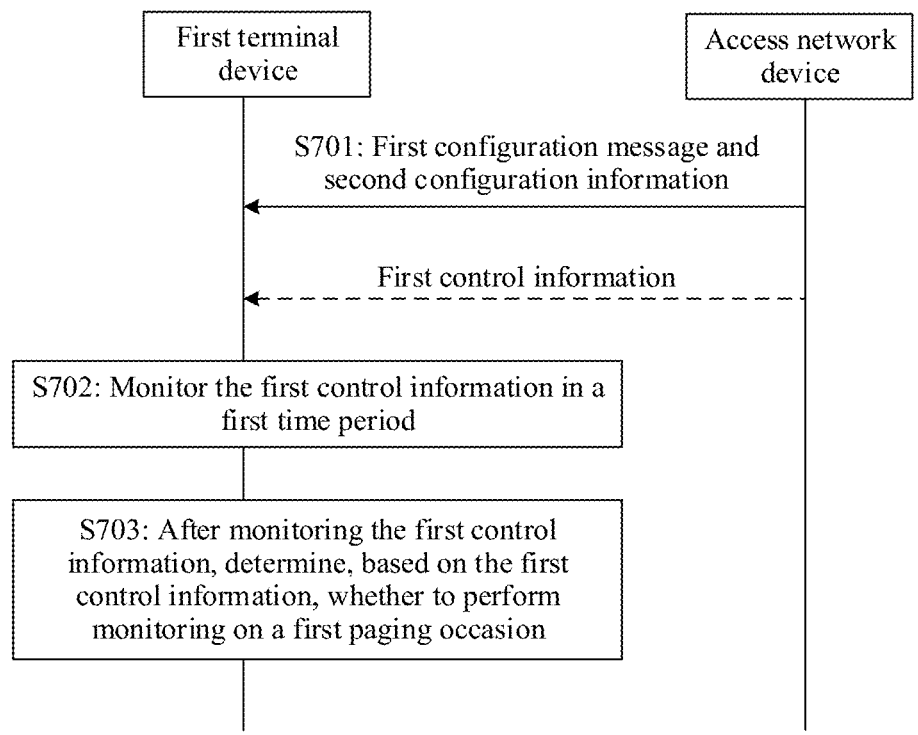
FIG. 7 is a schematic flowchart corresponding to a communication method according to an embodiment of this application.

FIG. 7 is a schematic flowchart corresponding to a communication method according to an embodiment of this application. As shown in FIG. 7, the method includes the following steps.

S701: The access network device sends first configuration information and second configuration information; and correspondingly, the first terminal device may receive the first configuration information and the second configuration information.

The first configuration information is used to configure a plurality of monitoring occasions of first control information of a first cell. For example, the first configuration information may be used to configure a search space (SS). The search space may be referred to as a power saving search space (power saving SS) or a camping search space (camping SS). The search space is used to determine the plurality of monitoring occasions of the first control information (where a quantity of symbols included in the monitoring occasion is not considered). It should be noted that the search space in this embodiment of this application may also be replaced with a search space set (SS set).

The second configuration information is used to configure a control resource set (CORESET). The control resource set may be referred to as a power saving control resource set (power saving CORESET) or a camping control resource set (camping CORESET). The control resource set is used to determine a frequency domain location of the first control information in the first cell.

Optionally, the access network device may send only the first configuration information, and the first terminal device may reuse other configuration information, for example, configuration information of a common CORESET, as the second configuration information.

The following describes the search space and the control resource set.

The search space configured by using the first configuration information is associated with the control resource set configured by using the second configuration information, and the search space and the control resource set may be used to determine the plurality of monitoring occasions of the first control information (where the quantity of symbols included in the monitoring occasion is considered).

Specifically, the control resource set determines a frequency domain resource for transmitting the first control information, that is, the first control information may be transmitted on the frequency domain resource corresponding to the control resource set, and the frequency domain resource corresponding to the control resource set may include a plurality of RBs. The search space determines a time domain resource for transmitting the first control information, and the search space may be configured with some time domain information, for example, a monitoring cycle (a time interval at which the search space is monitored, where a unit of the time interval may be slot), a slot offset (an offset between a slot in which the monitoring cycle starts and a slot in which the search space is actually monitored, where the slot offset is less than a value of the monitoring cycle), first duration (where the first duration is configured by using a duration parameter, is time during which the search space is continuously monitored, and may include a plurality of slots, and a quantity of included slots is less than the value of the monitoring cycle), and a time domain start location (a time domain start location corresponding to a control resource set associated with the search space in each slot). Each time domain start location may be understood as a time domain start location of one monitoring occasion.

Figure 8:
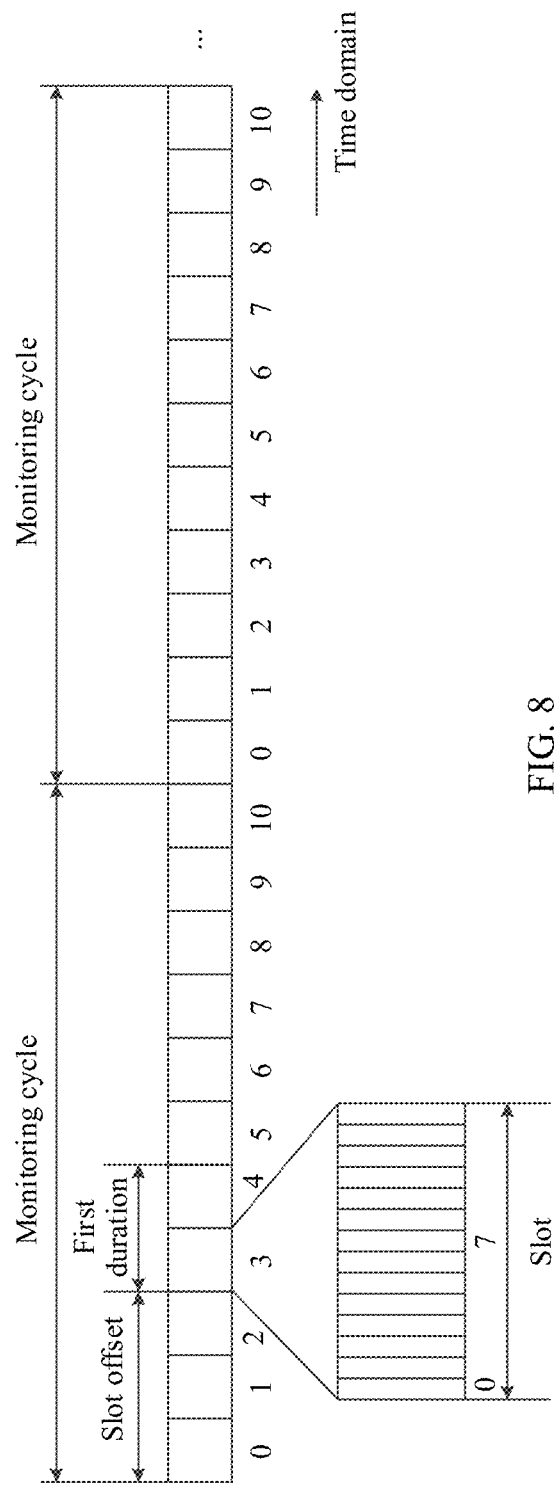
FIG. 8 shows an example of parameters of a search space according to an embodiment of this application.

For ease of understanding, specific examples are used to describe meanings of parameters. As shown in FIG. 8, the cycle of the search space is 10 slots, the slot offset is three slots, the first duration is two slots, the time domain start location is a symbol 0 and a symbol 7 in one slot, and second duration of the control resource set (where the second duration is configured by using a duration parameter, and is the quantity of symbols included in the monitoring occasion) is two symbols. In this example, there are four monitoring occasions in each monitoring cycle of 10 slots, where a symbol 0 and a symbol 1 in a slot 3 may be understood as one monitoring occasion, a symbol 7 and a symbol 8 in the slot 3 may be understood as one monitoring occasion, a symbol 0 and a symbol 1 in a slot 4 may be understood as one monitoring occasion, and a symbol 7 and a symbol 8 in the slot 4 may be understood as one monitoring occasion.

In addition, for example, the frequency domain resource corresponding to the control resource set may be a narrowband frequency domain resource, for example, a bandwidth may be 10 M or 5 M.

In an example, the frequency domain resource corresponding to the control resource set may fall within a frequency domain range within which a first synchronization signal block burst set falls.

In another example, the frequency domain resource corresponding to the control resource set may fall within an activated BWP, and the activated BWP is an initial BWP. The initial BWP is a BWP used by the first terminal device in an initial access phase. The access network device may configure the initial BWP for the first terminal device by using an SIB 1 or another possible SIB. For details, refer to the conventional technology.

In another example, the frequency domain resource corresponding to the control resource set may fall within an activated BWP, and the activated BWP is a first BWP. The first BWP is a BWP that is configured by the access network device for the first terminal device and that is used in an idle state, and the first BWP may be different from the initial BWP and also different from a dedicated BWP. The dedicated BWP is a BWP configured by the access network device for the first terminal device after the first terminal device enters a connected state.

For example, the access network device may configure the first BWP for the first terminal device in a plurality of manners. For example, the access network device may send configuration information (referred to as configuration information 1 for ease of differentiation) to the first terminal device. The configuration information 1 is used to configure the first BWP, or the configuration information 1 is used to configure a plurality of candidate BWPs. When the configuration information 1 is used to configure the plurality of candidate BWPs, the first terminal device may select one of the plurality of candidate BWPs, and the selected BWP is the first BWP. The first terminal device may select one of the plurality of candidate BWPs in a plurality of manners. For example, the first terminal device may select one of the plurality of candidate BWPs according to a predefined rule. This is not specifically limited. In addition, the configuration information 1 may be carried in the SIB 1 or another possible SIB. This is not specifically limited.

It should be noted that, in this embodiment of this application, the first configuration information may be configuration information for monitoring a time domain location of the first control information, and the first configuration information is not limited to search space configuration. The second configuration information may be configuration information for monitoring the frequency domain location of the first control information, and the second configuration information is not limited to CORESET configuration.

S702: The first terminal device monitors the first control information in a first time period, where the first control information is used to indicate, to the first terminal device, whether to perform monitoring on a first paging occasion.

S703: After monitoring the first control information, the first terminal device determines, based on the first control information, whether to perform monitoring on the first paging occasion.

Herein, the first terminal device may be in an idle state or an inactive state, and the first paging occasion may be any paging occasion corresponding to the first terminal device. In addition, the first paging occasion may be a paging occasion in the first cell, or may be a paging occasion in another cell. This embodiment of this application provides descriptions by using an example in which the first paging occasion is a paging occasion in the first cell.

I. The first time period is described.

(1) A possible location of the first time period is described.

In an example, the first time period may have an intersection set with time units in which the first synchronization signal block burst set of the first cell is located. For example, the first time period may include at least one time unit in which the first synchronization signal block burst set is located. Further, start time of the first time period is not earlier than start time of the first time unit in which the first synchronization signal block burst set is located, end time of the first time period may be not later than first preset time, and the first preset time is not later than start time of the first paging occasion. The first preset time may be preconfigured by the access network device for the first terminal device, or may be predefined by a protocol. There may be a plurality of specific implementations. The following provides descriptions by using examples.

For example, the time unit is slot, and the first synchronization signal block burst set includes eight SSBs: an SSB 0 to an SSB 7. When a subcarrier spacing is 30 KHz, one slot includes two SSBs. In this case, the first synchronization signal block burst set occupies four slots in time domain. For example, an SSB 0 and an SSB 1 are located in a slot 2, an SSB 2 and an SSB 3 are located in a slot 3, an SSB 4 and an SSB 5 are located in a slot 4, and an SSB 6 and an SSB 7 are located in a slot 5.

Figure 9:
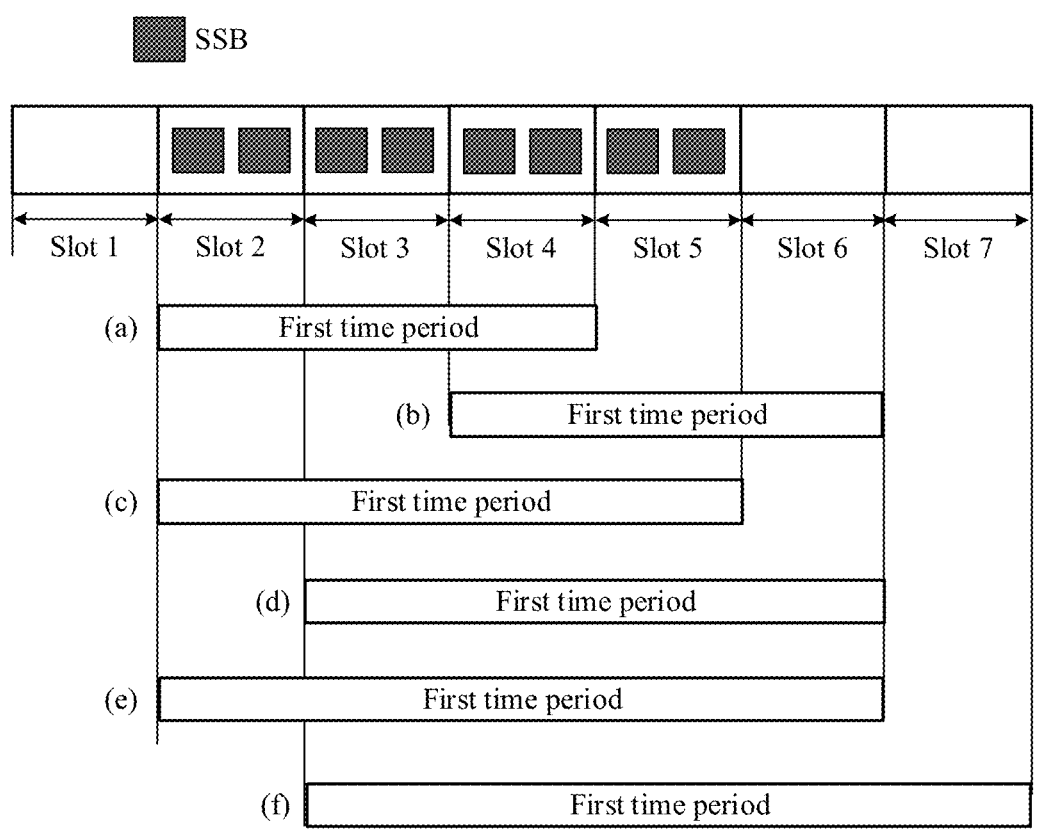
FIG. 9 is a plurality of possible examples of a first time period according to an embodiment of this application.

Based on the foregoing example, in a case 1, duration of the first time period may be less than duration (four slots) occupied by the first synchronization signal block burst set. For example, the duration of the first time period is three slots. The first time period may fall within the duration occupied by the first synchronization signal block burst set. For example, as shown in (a) in FIG. 9, the first time period may include the slot 2, the slot 3, and the slot 4. Alternatively, the first time period may intersect with some of the slots in which the first synchronization signal block burst set is located. For example, as shown in (b) in FIG. 9, the first time period may include the slot 4, the slot 5, and a slot 6.

In a case 2, duration of the first time period may be equal to duration occupied by the first synchronization signal block burst set (the duration of the first time period is four slots). In this case, the first time period may completely overlap the slots in which the first synchronization signal block burst set is located. For example, as shown in (c) in FIG. 9, the first time period may include the slot 2, the slot 3, the slot 4, and the slot 5. Alternatively, the first time period may intersect with some of the slots in which the first synchronization signal block burst set is located. For example, as shown in (d) in FIG. 9, the first time period may include the slot 3, the slot 4, the slot 5, and the slot 6.

In a case 3, duration of the first time period may be greater than duration occupied by the first synchronization signal block burst set. For example, the duration of the first time period is five slots. The duration occupied by the first synchronization signal block burst set may fall within the first time period. For example, as shown in (e) in FIG. 9, the first time period may include the slot 2, the slot 3, the slot 4, the slot 5, and the slot 6. Alternatively, the first time period may intersect with some of the slots in which the first synchronization signal block burst set is located. For example, as shown in (f) in FIG. 9, the first time period may include the slot 3, the slot 4, the slot 5, the slot 6, and the slot 7.

In another example, the first time period may have no intersection set with time units in which the first synchronization signal block burst set of the first cell is located, but is adjacent to the time units in which the first synchronization signal block burst set is located. Further, start time of the first time period may be end time of the last time unit in which the first synchronization signal block burst set is located. Still in the foregoing example, if the time unit is slot, the start time of the first time period may be end time of the slot 5. If the time unit is symbol, the start time of the first time period may be end time of the twelfth symbol in the slot 5. In addition, end time of the first time period may be not later than first preset time, and the first preset time is not later than start time of the first paging occasion.

(2) A manner in which the first terminal device determines the first time period is described.

The first terminal device may determine the first time period in a plurality of manners. For example, the first terminal device may determine the first time period based on the time units in which the first synchronization signal block burst set is located or a time unit in which at least one SSB in the first synchronization signal block burst set is located.

In an example, the access network device may send time information of the first time period. Correspondingly, the first terminal device may receive the time information of the first time period, and further determine the first time period based on the time units in which the first synchronization signal block burst set is located or the time unit in which the at least one SSB in the first synchronization signal block burst set is located, and the time information of the first time period.

The time information of the first time period includes at least one of the following: an offset of the start time of the first time period, the duration of the first time period, or an offset of the end time of the first time period. The offset of the start time of the first time period may be an offset of the start time of the first time period relative to start time or end time of the time units in which the first synchronization signal block burst set is located, or an offset of the start time of the first time period relative to start time or end time of a time unit in which an $M1^{th}$ SSB in the first synchronization signal block burst set is located. The duration of the first time period may include at least one consecutive slot and/or at least one consecutive symbol. This is not specifically limited. The offset of the end time of the first time period may be an offset of the end time of the first time period relative to the start time or the end time of the time units in which the first synchronization signal block burst set is located, or an offset of the end time of the first time period relative to start time or end time of a time unit in which an $M2^{th}$ SSB in the first synchronization signal block burst set is located. For example, the offset may include at least one slot and/or at least one symbol. This is not specifically limited.

For example, the start time of the first time period is offset by 0 slots relative to the start time of the time units in which the first synchronization signal block burst set is located (the start time of the first time period is the start time of the time units in which the first synchronization signal block burst set is located), and the duration of the first time period includes four slots. In this case, the first terminal device may determine the first time period based on the start time of the first time period and the duration of the first time period.

II. The first synchronization signal block burst set is described.

The first synchronization signal block burst set may be located in front of the first paging occasion in time domain. For example, the first synchronization signal block burst set is any one of last N synchronization signal block burst sets located in front of the first paging occasion, and N is a positive integer. For example, if N=2, the first synchronization signal block burst set may be the last synchronization signal block burst set located in front of the first paging occasion, or the first synchronization signal block burst set may be the penultimate synchronization signal block burst set located in front of the first paging occasion. For example, when the first terminal device is in a low coverage scenario (when a signal-to-noise ratio of the terminal is low), the first synchronization signal block burst set may be the penultimate synchronization signal block burst set located in front of the first paging occasion. In this way, if the first terminal device monitors the first control information in the first time period, and the first control information indicates the terminal device to perform monitoring on the first paging occasion, indicating that the first terminal device may be paged, in addition to receiving the first synchronization signal block burst set, the first terminal device may further receive a next synchronization signal block burst set (the last synchronization signal block burst set located in front of the first paging occasion) of the first synchronization signal block burst set, to perform time-frequency synchronization, thereby ensuring subsequent receiving performance. When the first terminal device is in a good coverage scenario (a high signal-to-noise ratio scenario), the first synchronization signal block burst set may be the last synchronization signal block burst set located in front of the first paging occasion. In this case, if determining, based on the first control information, that the first terminal device may be paged, the first terminal device performs time-frequency synchronization based on the first synchronization signal block burst set, thereby ensuring subsequent receiving performance.

This embodiment of this application provides descriptions by using an example in which the first synchronization signal block burst set may be the last synchronization signal block burst set located in front of the first paging occasion.

For example, the first terminal device may receive an SSB in the first synchronization signal block burst set. If the first synchronization signal block burst set includes an SSB 0 to an SSB 7, the first terminal device may receive at least one SSB in the SSB 0 to the SSB 7. Specifically, a specific SSB that is in the first synchronization signal block burst set and that is received by the first terminal device or specific SSBs that are in the first synchronization signal block burst set and that are received by the first terminal device may depend on an internal implementation. This is not limited.

III. Monitoring performed by the first terminal device on the first control information in the first time period is described.

In the foregoing S701, the first terminal device may receive the first configuration information and the second configuration information; and may further determine the plurality of monitoring occasions of the first control information based on the first configuration information and the second configuration information, and monitor the control information on a first monitoring occasion that is in the plurality of monitoring occasions and that is located in the first time period. The first monitoring occasion may be an effective monitoring occasion.

For example, 10 monitoring occasions of the plurality of monitoring occasions of the first control information are located in the first time period. It is considered that the 10 monitoring occasions are not all effective monitoring occasions. For example, when the first time period can have an intersection set with the time units in which the first synchronization signal block burst set is located, some monitoring occasions in the first time period may overlap SSBs in the first synchronization signal block burst set in time domain, and these SSBs that overlap the SSBs in the first synchronization signal block burst set in time domain are ineffective monitoring occasions. In addition, a monitoring occasion may be an ineffective monitoring occasion for another possible reason. This is not specifically limited. It is assumed that, in the 10 monitoring occasions in the first time period, six monitoring occasions are effective monitoring occasions, and four monitoring occasions are ineffective monitoring occasions. In this case, the first terminal device may perform monitoring on the six effective monitoring occasions, without performing monitoring on the four ineffective monitoring occasions.

With reference to several examples, the following describes some possible implementations in which the first terminal device monitors the first control information in the first time period.

For example, it is assumed that the frequency domain resource corresponding to the control resource set falls within the frequency domain range within which the first synchronization signal block burst set falls. As shown in (a) in FIG. 10, the first time period completely overlaps slots in which the first synchronization signal block burst set is located, and the first time period includes eight effective monitoring occasions, so that the first terminal device can monitor the first control information on the eight effective monitoring occasions. In addition, in terms of frequency domain, because the frequency domain resource (a frequency domain resource of the monitoring occasions) corresponding to the control resource set falls within the frequency domain range within which the first synchronization signal block burst set falls, the first terminal device can operate in the first time period in a bandwidth occupied by SSBs in the first synchronization signal block burst set, without extension of an operating bandwidth. In terms of time domain, because the first time period completely overlaps the slots in which the first synchronization signal block burst set is located, the first terminal device can monitor the first control information in a time period in which the first synchronization signal block burst set is received, thereby helping reduce power consumption of the first terminal device.

Figure 10:
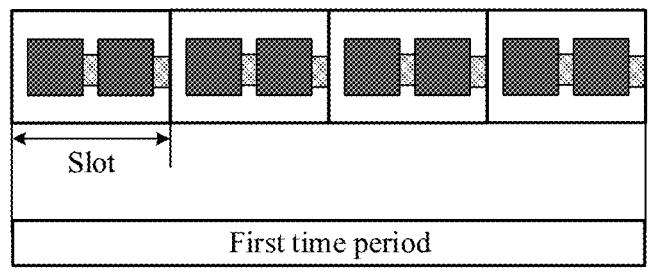
FIG. 10 shows an example in which a first terminal device monitors first control information in a first time period.
Figure 10:
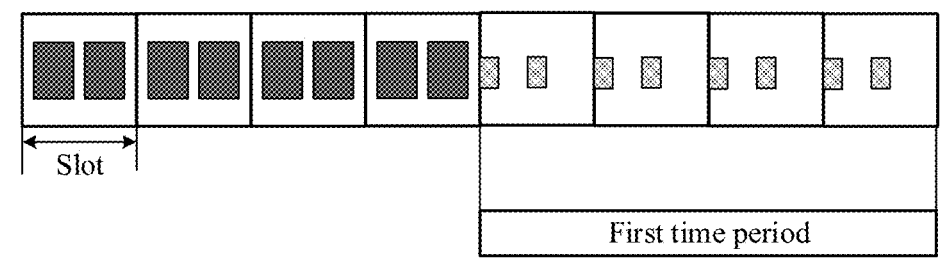

As shown in (b) in FIG. 10, the first time period is adjacent to slots in which the first synchronization signal block burst set is located. For example, the first time period includes four slots behind the slots in which the first synchronization signal block burst set is located, and the first time period includes eight effective monitoring occasions, so that the first terminal device can monitor the first control information on the eight effective monitoring occasions. In addition, in terms of frequency domain, because the frequency domain resource (a frequency domain resource of the monitoring occasions) corresponding to the control resource set falls within the frequency domain range within which the first synchronization signal block burst set falls, after receiving SSBs in the first synchronization signal block burst set, the first terminal device can operate in the first time period in a bandwidth of the frequency domain resource corresponding to the control resource set, to monitor the first control information. In terms of time domain, because the first time period is adjacent to the slots in which the first synchronization signal block burst set is located, after receiving the SSBs in the first synchronization signal block burst set, the first terminal device may continue to keep a wake-up state to monitor the first control information.

For another example, it is assumed that the frequency domain resource corresponding to the control resource set falls within the initial BWP. As shown in (a) in FIG. 11, the first time period completely overlaps slots in which the first synchronization signal block burst set is located, and the first time period includes eight effective monitoring occasions, so that the first terminal device can monitor the first control information on the eight effective monitoring occasions. In addition, in terms of frequency domain, because the frequency domain resource corresponding to the control resource set falls within the initial BWP, the first terminal device can extend an operating bandwidth in the first time period, so that the operating bandwidth can include a bandwidth occupied by SSBs in the first synchronization signal block burst set and a bandwidth of the frequency domain resource corresponding to the control resource set. In terms of time domain, because the first time period completely overlaps the slots in which the first synchronization signal block burst set is located, the first terminal device can monitor the first control information in a time period in which the first synchronization signal block burst set is received, thereby helping reduce power consumption of the first terminal device.

Figure 11:
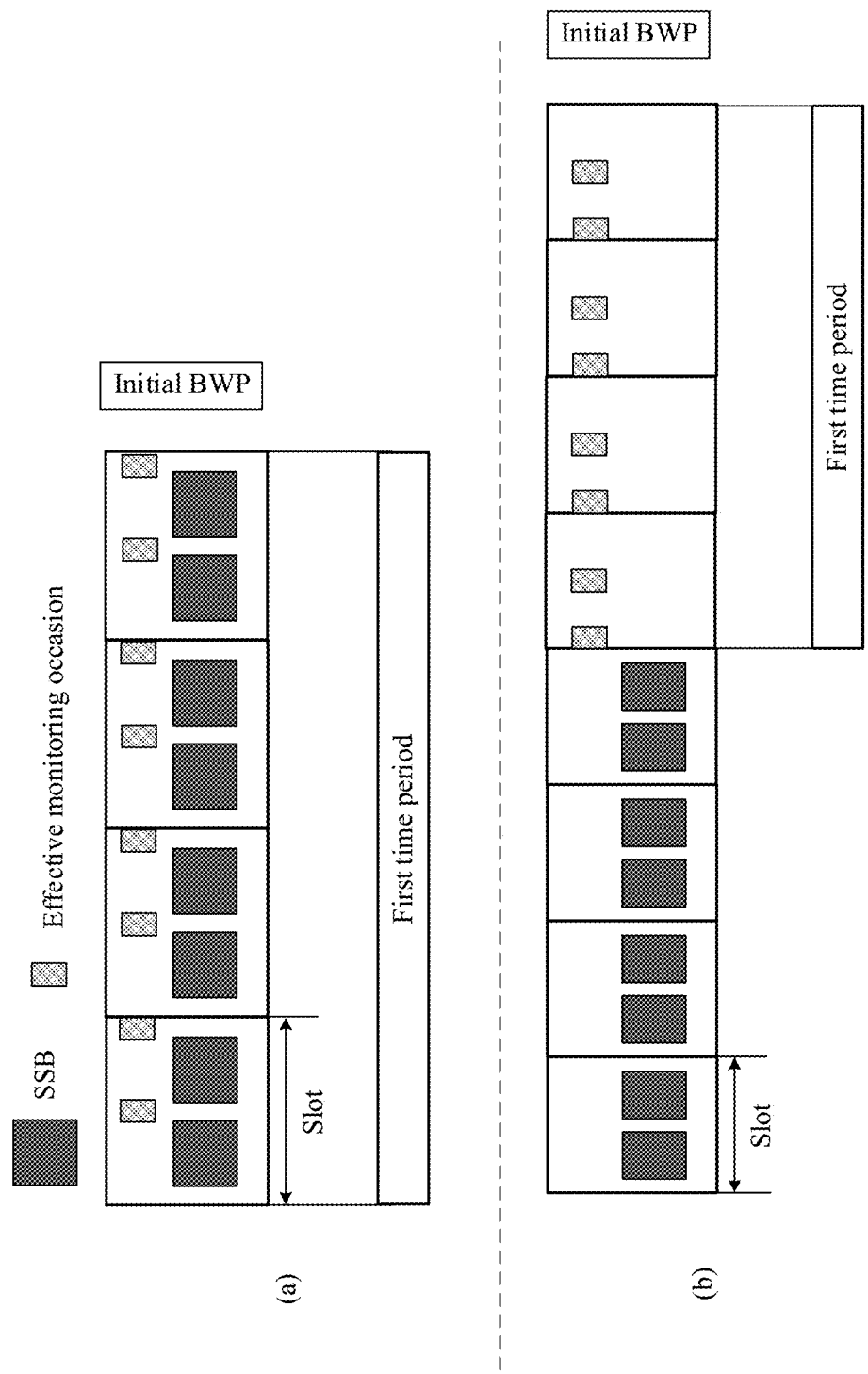
FIG. 11 shows an example in which a first terminal device monitors first control information in a first time period.

As shown in (b) in FIG. 11, the first time period is adjacent to slots in which the first synchronization signal block burst set is located. For example, the first time period includes four slots behind the slots in which the first synchronization signal block burst set is located, and the first time period includes eight effective monitoring occasions, so that the first terminal device can monitor the first control information on the eight effective monitoring occasions. In addition, in terms of frequency domain, because the frequency domain resource corresponding to the control resource set falls within the initial BWP, after receiving SSBs in the first synchronization signal block burst set, the first terminal device can operate in the initial BWP, to monitor the first control information. In terms of time domain, because the first time period is adjacent to the slots in which the first synchronization signal block burst set is located, after receiving the SSBs in the first synchronization signal block burst set, the first terminal device may continue to keep a wake-up state to monitor the first control information.

For another example, it is assumed that the frequency domain resource corresponding to the control resource set falls within the first BWP. As shown in (a) in FIG. 12, the first time period completely overlaps slots in which the first synchronization signal block burst set is located, and the first time period includes eight effective monitoring occasions, so that the first terminal device can monitor the first control information on the eight effective monitoring occasions. In addition, in terms of frequency domain, because the frequency domain resource corresponding to the control resource set falls within the first BWP, the first terminal device can extend an operating bandwidth in the first time period, so that the operating bandwidth can include a bandwidth occupied by SSBs in the first synchronization signal block burst set and a bandwidth of the frequency domain resource corresponding to the control resource set. In terms of time domain, because the first time period completely overlaps the slots in which the first synchronization signal block burst set is located, the first terminal device can monitor the first control information in a time period in which the first synchronization signal block burst set is received, thereby helping reduce power consumption of the first terminal device.

Figure 12:
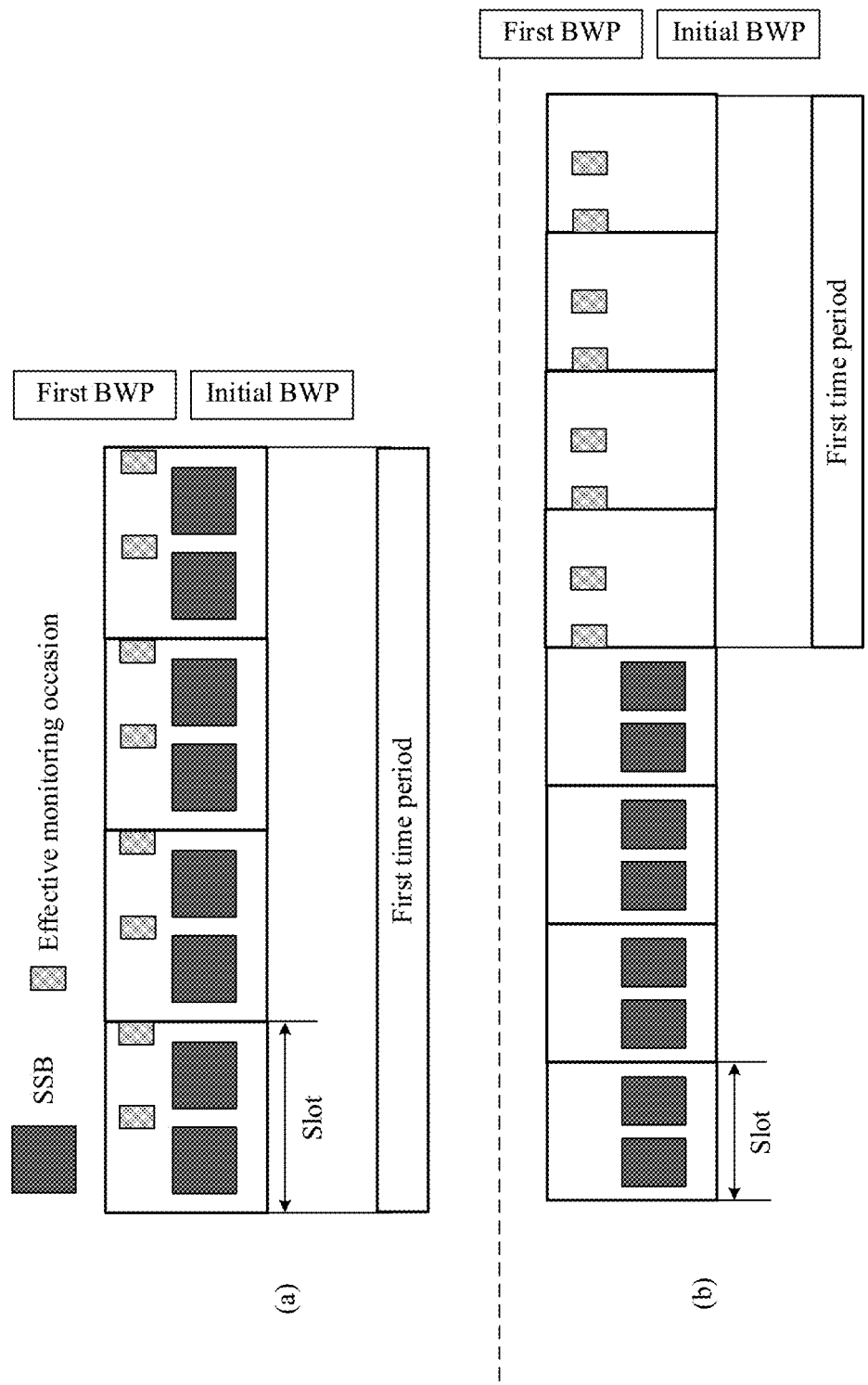
FIG. 12 shows an example in which a first terminal device monitors first control information in a first time period.

As shown in (b) in FIG. 12, the first time period is adjacent to slots in which the first synchronization signal block burst set is located. For example, the first time period includes four slots behind the slots in which the first synchronization signal block burst set is located, and the first time period includes eight effective monitoring occasions, so that the first terminal device can monitor the first control information on the eight effective monitoring occasions. In addition, in terms of frequency domain, because the frequency domain resource corresponding to the control resource set falls within the first BWP, after receiving SSBs in the first synchronization signal block burst set, the first terminal device can switch from the initial BWP to the first BWP, to monitor the first control information. In terms of time domain, because the first time period is adjacent to the slots in which the first synchronization signal block burst set is located, after receiving the SSBs in the first synchronization signal block burst set, the first terminal device may continue to keep a wake-up state to monitor the first control information.

For example, in the foregoing cases shown in FIG. 10 to FIG. 12, if the first terminal device receives an SSB 0 (for example, an SSB on a leftmost side) by using a beam 0, when performing monitoring on the first monitoring occasion (for example, a monitoring occasion on a leftmost side), the first terminal device may consider that there is a type-D quasi-co-location (QCL) relationship with the SSB 0, that is, receiving can be performed by using the beam 0. If the first terminal device receives an SSB 1 (for example, the second SSB from the left) by using a beam 1, when performing monitoring on the second monitoring occasion (for example, the second monitoring occasion from the left), the first terminal device may consider that there is a Type-D QCL relationship with the SSB 1, that is, receiving can be performed by using the beam 1. If the first terminal device receives an SSB 2 (for example, the third SSB from the left) by using a beam 2, when performing monitoring on the third monitoring occasion (for example, the third monitoring occasion from the left), the first terminal device may consider that there is a Type-D QCL relationship with the SSB 2, that is, receiving can be performed by using the beam 2. By analogy, details are not described.

IV. The first control information is described.

For example, the first control information may be carried on a physical downlink control channel (PDCCH). For example, the first control information may be DCI. A format of the DCI may be a newly designed DCI format, or may still be an existing DCI format. For example, the format of the DCI is DCI format 2_6.

Optionally, the first control information may be carried on another physical channel or in a physical signal, for example, a dedicated indication signal. Correspondingly, the first configuration information and the second configuration information in S701 respectively correspond to time domain monitoring occasion (or detection occasion) configuration information and frequency domain configuration information of the physical channel or the physical signal.

In an example 1, the DCI may include an information element 1. After receiving the DCI, the first terminal device may determine, based on information in the information element 1, whether to perform monitoring on the first paging occasion. For example, the information element 1 may include 1 bit. When a value of the bit is 1, the first terminal device is indicated to perform monitoring on the first paging occasion; or when a value of the bit is 0, the first terminal device is indicated to not perform monitoring on the first paging occasion; or vice versa.

In an example 2, considering that the first paging occasion may correspond to a plurality of terminal devices including the first terminal device, the plurality of terminal devices may be grouped. The DCI may indicate terminal devices in a terminal device group or some terminal device groups to perform monitoring on the first paging occasion and/or indicate terminal devices in a terminal device group or some terminal device groups not to perform monitoring on the first paging occasion.

For example, the DCI may include an information element 1. After receiving the DCI, the first terminal device may determine, based on a terminal device group to which the first terminal device belongs and information in the information element 1, whether to perform monitoring on the first paging occasion. For example, if the first paging occasion corresponds to a total of 50 terminal devices, the 50 terminal devices may be divided into five terminal device groups. The information element 1 may include 5 bits, and each bit corresponds to one terminal device group. For each bit, when a value of the bit is 1, terminal devices in a terminal device group corresponding to the bit are indicated to perform monitoring on the first paging occasion; or when a value of the bit is 0, terminal devices in a terminal device group corresponding to the bit are indicated to not perform monitoring on the first paging occasion; or vice versa. Further, the first terminal device may determine, based on a value of a bit corresponding to a terminal device group to which the first terminal device belongs in the information element 1, whether to perform monitoring on the first paging occasion.

For another example, if the first paging occasion corresponds to a total of 50 terminal devices, the 50 terminal devices may be divided into five terminal device groups. Terminal devices in different terminal device groups may descramble the DCI by using different RNTIs. If terminal devices in a terminal device group 1 successfully descramble the DCI, the terminal devices in the terminal device group 1 may further determine, based on the information element 1, whether to perform monitoring on the first paging occasion. In this case, the information element 1 may include 1 bit. When a value of the bit is 1, the terminal devices in the terminal device group 1 are indicated to perform monitoring on the first paging occasion; or when a value of the bit is 0, the terminal devices in the terminal device group 1 are indicated not to perform monitoring on the first paging occasion; or vice versa. Alternatively, the terminal devices in the terminal device group 1 may be further grouped. It is assumed that the terminal devices are divided into two sub-groups. The information element 1 may include 2 bits, and each bit corresponds to one sub-group. For each bit, when a value of the bit is 1, terminal devices in a sub-group corresponding to the bit are indicated to perform monitoring on the first paging occasion; or when a value of the bit is 0, terminal devices in a sub-group corresponding to the bit are indicated to not perform monitoring on the first paging occasion; or vice versa. A terminal device that fails to descramble the DCI may not perform monitoring on the first paging occasion by default.

In an example 3, the first control information may further correspond to paging occasions of different terminal devices, that is, the first control information may correspond to a plurality of different paging occasions (for example, X paging occasions, where X is an integer greater than or equal to 2). Each paging occasion may correspond to a plurality of terminal devices. Therefore, an information element 1 may be divided into X segments, and each segment corresponds to one paging occasion. Each segment may further indicate, to terminal devices, whether the terminal devices need to perform monitoring on a paging occasion corresponding to the segment.

For example, in the foregoing example 1, example 2, or example 3, the access network device may send configuration information (referred to as configuration information 2 for ease of differentiation), and the configuration information 2 may include at least one of the following: start location information of the information element 1 in the DCI, a length of the information element 1 (a quantity of bits included in the information element 1), and end location information of the information element 1 in the DCI. Further, after receiving the configuration information 2, the first terminal device may determine a location of the information element 1 in the DCI based on the configuration information 2. The configuration information 2 may be carried in the SIB 1 or another possible SIB. This is not specifically limited.

It should be noted that the access network device may send the first control information in the first time period. In this case, after monitoring the first control information, the first terminal device may determine, based on the first control information, whether to perform monitoring on the first paging occasion. Alternatively, the access network device may not send the first control information in the first time period. In this case, the first terminal device does not monitor the first control information. In this embodiment of this application, if monitoring no first control information in the first time period, the first terminal device may not perform monitoring on the first paging occasion by default, or may perform monitoring on the first paging occasion by default. Alternatively, configuration is performed by the access network device. In this case, the first terminal device determines, based on configuration information, whether to perform monitoring on the first paging occasion.

In this way, in a current solution, because the terminal device does not know when the access network device performs paging, for each paging occasion, the terminal device performs the process shown in (a) in FIG. 6. In this embodiment of this application, considering that a probability that the terminal device is paged is usually relatively low, for a paging occasion, the access network device may send the first control information to the terminal device before the paging occasion. The first control information indicates the terminal device to perform monitoring (in this case, the terminal device may be paged) or not to perform monitoring (in this case, the terminal device is not paged) on the paging occasion. Further, when the terminal device determines, based on the first control information, to perform monitoring on the first paging occasion, reference may be made to (a) in FIG. 6; or when determining, based on the first control information, not to perform monitoring on the first paging occasion, the first terminal device may enter a deep sleep state (or a light sleep state), as shown in, for example, (b) in FIG. 6. Therefore, the terminal device can pertinently perform monitoring, thereby effectively reducing power consumption of the terminal device.

Further, the terminal device may monitor the first control information in idle time in which the first synchronization signal block burst set is received (for example, the case shown in (b) in FIG. 6), or monitor the first control information in near time after the first synchronization signal block burst set is received, so that the receiving of the first synchronization signal block burst set and the monitoring of the first control information can be completed in a very short period of time. In this manner, the terminal device introduces no additional state switching when monitoring the first control information, so that power consumption overheads caused by the terminal device are very small.

In the foregoing embodiment, a synchronization signal block burst set in front of the first paging occasion is described. Based on the foregoing embodiment, the following describes some possible implementations through extension from different perspectives: an implementation 1 and an implementation 2.

Implementation 1

For example, the first synchronization signal block burst set in the foregoing embodiment is the penultimate synchronization signal block burst set located in front of the first paging occasion. A second synchronization signal block burst set is the last synchronization signal block burst set located in front of the first paging occasion. In this case, if the first terminal device monitors the first control information in the first time period, and the first control information indicates the first terminal device to perform monitoring on the first paging occasion, the first terminal device further continues to receive the second synchronization signal block burst set, and subsequently performs paging on the first paging occasion. For a specific implementation process, refer to (a) in FIG. 13. In this process, the first terminal device wakes up from deep sleep, and enters light sleep after receiving the first synchronization signal block burst set and the first control information; then wakes up again and receives the second synchronization signal block burst set, and enters light sleep again after receiving the second synchronization signal block burst set; and then wakes up again and performs monitoring on the first paging occasion. Therefore, it can be learned that the first terminal device needs to perform state switching for a plurality of times, and consequently power consumption of the first terminal device is relatively high.

To resolve this problem, a possible implementation is provided herein. That is, in addition to being used to indicate, to the first terminal device, whether to perform monitoring on the first paging occasion, the first control information may be used to indicate whether a first-type reference signal in the first cell is to be sent in a second time period. The first-type reference signal is used by at least one idle-state or inactive-state terminal device including the first terminal device to perform time-frequency synchronization. For example, the first-type reference signal may be a tracking reference signal (TRS), or may be another reference signal such as a channel state information-reference signal (CSI-RS).

(1) In an example, start time of the second time period is not earlier than the end time of the first synchronization signal block burst set, the end time of the first time period, or end time of a time unit in which the detected first control information is located, and end time of the second time period is not later than the start time of the first paging occasion. For example, the second time period may overlap the first time period, or the start time of the second time period is the end time of the first time period. Further, the end time of the second time period is not later than start time of a second synchronization signal block burst set, and the second synchronization signal block burst set is a next synchronization signal block burst set of the first synchronization signal block burst set.

The example in which the first synchronization signal block burst set is the penultimate synchronization signal block burst set located in front of the first paging occasion, and the second synchronization signal block burst set is the last synchronization signal block burst set located in front of the first paging occasion is still used. Refer to (b) in FIG. 13. If the first terminal device monitors the first control information in the first time period, and the first control information indicates the first terminal device to perform monitoring on the first paging occasion and indicates that the first-type reference signal is to be sent in the second time period, the first terminal device may receive the first-type reference signal in the second time period to perform time-frequency synchronization, and subsequently perform monitoring on the first paging occasion. Because the first terminal device receives the first-type reference signal in the second time period to perform time-frequency synchronization, and the first-type reference signal may also be used to perform time-frequency synchronization together with the first synchronization signal block burst set, the first terminal device does not need to further receive the second synchronization signal block burst set to perform time-frequency synchronization. For example, in (b) in FIG. 13, the first terminal device may wake up from deep sleep, and enter a light sleep state or a deep sleep state after receiving the first synchronization signal block burst set, the first control information, and the first-type reference signal; and then wake up again and perform monitoring on the first paging occasion, so that a quantity of state switching times of the first terminal device can be reduced, thereby reducing power consumption of the first terminal device.

In addition, the end time of the second time period is not later than the start time of the second synchronization signal block burst set. Therefore, if failing to receive the first-type reference signal in the second time period, the first terminal device may further receive the second synchronization signal block burst set to perform time-frequency synchronization, thereby effectively ensuring subsequent receiving performance.

(2) In another example, the second time period includes a time period a and/or a time period b. Start time of the time period a is not earlier than the end time of the first synchronization signal block burst set, the end time of the first time period, or end time of a time unit in which the detected first control information is located, and end time of the time period a is not later than second preset time. For example, a time interval between the start time of the time period a and the end time of the first time period may be less than or equal to a preset threshold 1. Start time of the time period b is not earlier than third preset time, and end time of the time period b is not later than the start time of the first paging occasion. For example, a time interval between the end time of the time period b and the start time of the first paging occasion may be less than or equal to a preset threshold 2. The second preset time, the third preset time, the preset threshold 1, or the preset threshold 2 may be predefined by a protocol, or may be configured by the access network device for the first terminal device. This is not specifically limited.

Case 1: The second time period includes the time period a. The example in which the first synchronization signal block burst set is the penultimate synchronization signal block burst set located in front of the first paging occasion, and the second synchronization signal block burst set is the last synchronization signal block burst set located in front of the first paging occasion is still used. Refer to (c) in FIG. 13. The first terminal device wakes up from deep sleep, and enters micro-sleep after receiving the first synchronization signal block burst set and the first control information; then wakes up again and receives the first-type reference signal in the time period a, and enters light sleep after receiving the first-type reference signal; and then wakes up again and performs monitoring on the first paging occasion. Because power consumption is relatively small when the first terminal device wakes up from the micro-sleep (power consumption of switching from the micro-sleep to a receiving state is relatively small), compared with (a) in FIG. 13, one time of light sleep is omitted, and one time of state switching to light sleep is also omitted, thereby effectively reducing power consumption of the first terminal device.

Case 2: The second time period includes the time period b. The example in which the first synchronization signal block burst set is the penultimate synchronization signal block burst set located in front of the first paging occasion, and the second synchronization signal block burst set is the last synchronization signal block burst set located in front of the first paging occasion is still used. Refer to (d) in FIG. 13. The first terminal device wakes up from deep sleep, and enters light sleep after receiving the first synchronization signal block burst set and the first control information; then wakes up again and receives the first-type reference signal in the time period b, and enters micro-sleep after receiving the first-type reference signal; and then wakes up again and performs monitoring on the first paging occasion. Because power consumption is relatively small when the first terminal device wakes up from the micro-sleep, compared with (a) in FIG. 13, one time of light sleep is omitted, and one time of state switching to light sleep is also omitted, thereby effectively reducing power consumption of the first terminal device.

Figure 13:
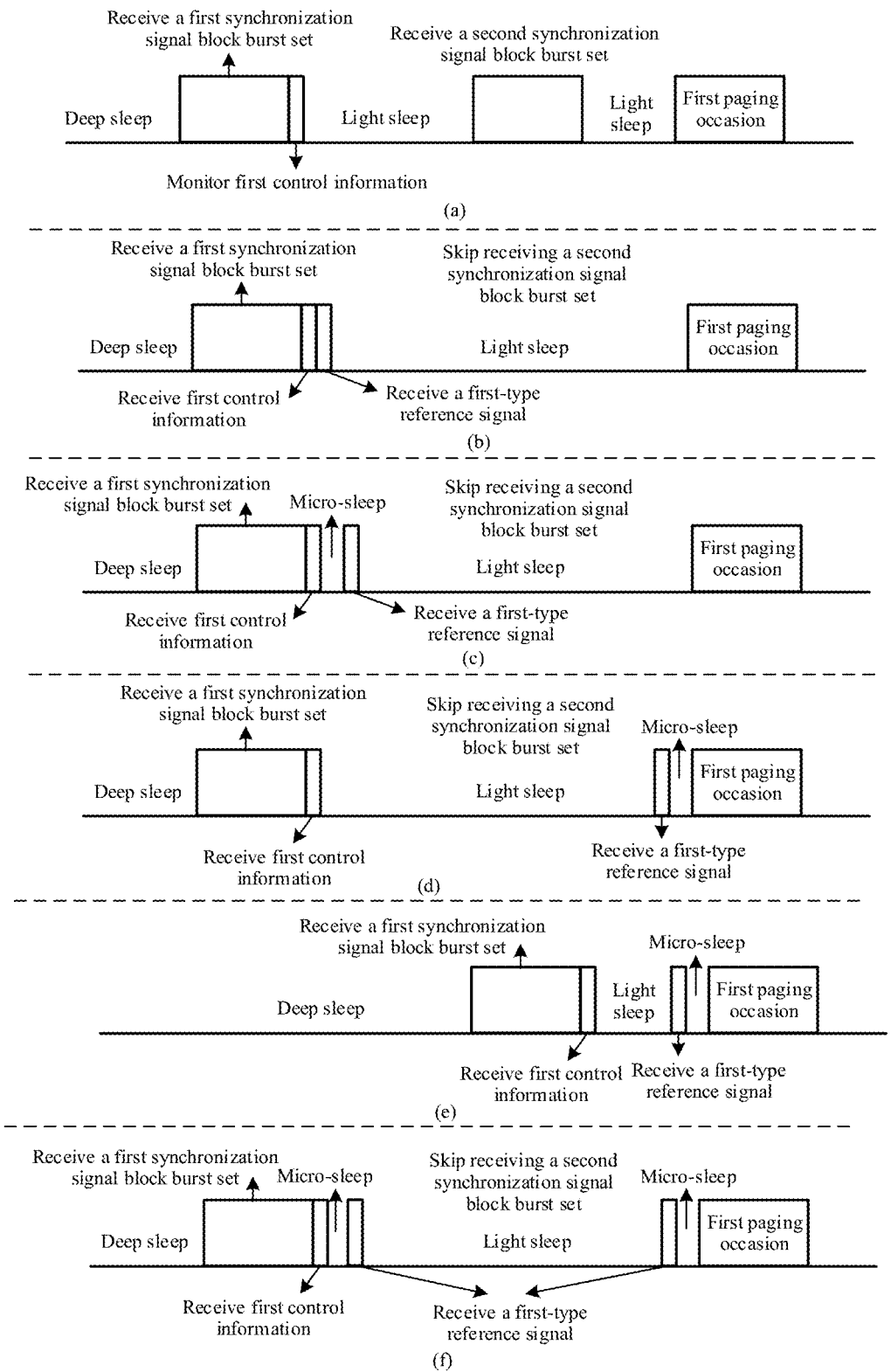
FIG. 13 shows an example of a related implementation related to a second time period according to an embodiment of this application.

It should be noted that when the second time period includes the time period b, the first synchronization signal block burst set may also be the last synchronization signal block burst set located in front of the first paging occasion, as shown in (e) in FIG. 13.

Case 3: The second time period includes the time period a and the time period b. In this case, when the first control information indicates that the first-type reference signal is not to be sent in the second time period, it indicates that the first-type reference signal is to be sent in neither the time period a nor the time period b. When the first control information indicates that the first-type reference signal is to be sent in the second time period, it may be understood that the first-type reference signal is to be sent in the time period a or the time period b. In this case, refer to (f) in FIG. 13. The first terminal device wakes up from deep sleep, and enters micro-sleep after receiving the first synchronization signal block burst set and the first control information; then wakes up again and receives the first-type reference signal in the time period a, and then enters light sleep. Further, if receiving the first-type reference signal in the time period a, the first terminal device may subsequently wake up and perform monitoring on the first paging occasion. If receiving no first-type reference signal in the time period a, the first terminal device may subsequently wake up and receive the first-type reference signal in the time period b, and enter micro-sleep after receiving the first-type reference signal; and then wake up and perform monitoring on the first paging occasion. Because power consumption is relatively small when the first terminal device wakes up from the micro-sleep, compared with (a) in FIG. 13, one time of light sleep is omitted, and one time of state switching to light sleep is also omitted, thereby effectively reducing power consumption of the first terminal device.

Alternatively, when the first control information indicates that the first-type reference signal is to be sent in the second time period, it may be understood that the first-type reference signal is to be sent in the time period a and the time period b. In this case, the first terminal device may flexibly choose to receive the first-type reference signal in the time period a, receive the first-type reference signal in the time period b, or receive the first-type reference signal in the time period a and also receive the first-type reference signal in the time period b. For example, the first terminal device may choose to perform the operation in a manner shown in (e) in FIG. 13.

Implementation 2

The first control information in the foregoing embodiment may be replaced with second control information, and the second control information may be used to indicate, based on whether a specific signal or a specific channel is sent, whether monitoring needs to be performed on a corresponding paging occasion. In an example, the second control information is used to indicate the first terminal device to perform monitoring on the first paging occasion. In this case, if receiving, in the first time period, a signal corresponding to the second control information, the first terminal device may perform monitoring on the first paging occasion; or if receiving, in the first time period, no signal corresponding to the second control information, the first terminal device may not perform monitoring on the first paging occasion.

Further, in the implementation 2, the second control information may further indicate, through transmission of a signal in a plurality of different specific signals, whether the access network device is to send a first reference signal in a second time period. For example, the second control information corresponds to a signal 1 and a signal 2. If the first terminal device detects, in the first time period, that the signal 1 is sent, the second control information indicates the first terminal device to perform monitoring on the first paging occasion, and indicates that the access network device is to send the first reference signal in the second time period. If the first terminal device detects, in the first time period, that the signal 2 is sent, the second control information indicates the first terminal device to perform monitoring on the first paging occasion, and indicates that the access network device is not to send the first reference signal in the second time period. If the first terminal device detects neither the signal 1 nor the signal 2 in the first time period, the second control information indicates the terminal device not to perform monitoring on the first paging occasion.

Further, in the implementation 2, the second control information may indicate, through transmission of a signal in a plurality of different specific signals, terminal devices in different groups to perform monitoring on corresponding paging occasions. For example, the second control information corresponds to a signal 1 and a signal 2. If the first terminal device detects, in the first time period, that the signal 1 is sent, the second control information indicates terminal devices in a first group (the first terminal device belongs to the terminal devices in the first group) to perform monitoring on the first paging occasion. If a second terminal device detects, in the first time period, that the signal 2 is sent, the second control information indicates terminal devices in a second group (the second terminal device belongs to the terminal devices in the second group) to perform monitoring on a paging occasion. If a third terminal device detects neither the signal 1 nor the signal 2 in the first time period, the second control information indicates the third terminal device not to perform monitoring on a corresponding paging occasion.

Further, in the implementation 2, the second control information may indicate, through transmission of a signal in a plurality of different specific signals, terminal devices in different groups to perform monitoring on corresponding paging occasions and whether the first reference signal is to be sent in the second time period.

In addition, the following should be noted: (1) Different implementations described in the foregoing embodiments may be separately implemented, or a plurality of different implementations may be adaptively implemented in combination. This is not specifically limited.

(2) The step numbers of each flowchart described in the foregoing embodiments are merely a procedure execution example, and do not constitute a limitation on a step execution sequence. In the embodiments of this application, there is no strict execution sequence between steps having no time sequence dependence relationship with each other. In addition, not all the steps shown in each flowchart are necessarily performed steps, and some steps may be added or deleted based on each flowchart according to an actual requirement.

The solutions provided in the embodiments of this application are mainly described above from a perspective of interaction between the access network device and the terminal device. It may be understood that, to implement the foregoing functions, the access network device or the terminal device may include a corresponding hardware structure and/or software module for implementing each function. A person skilled in the art should be easily aware that, in combination with the examples described in embodiments disclosed in this specification, units, algorithms, and steps may be implemented by hardware or a combination of hardware and computer software in embodiments of this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, functional unit division may be performed on the terminal device and the access network device based on the foregoing method examples. For example, each functional unit may be obtained through division based on each corresponding function, or two or more functions may be integrated into one unit. The integrated unit may be implemented in a form of hardware, or may be implemented in a form of a software functional unit.

Figure 14:
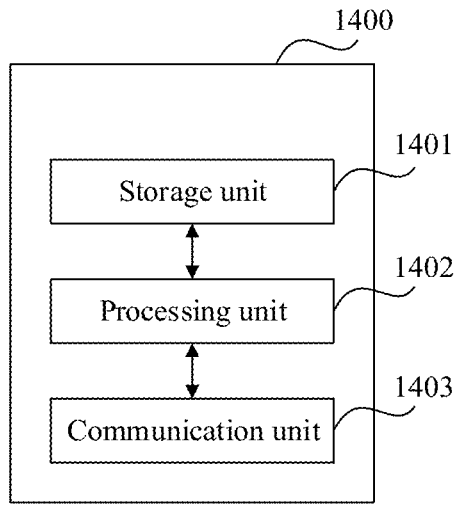
FIG. 14 is a possible example block diagram of an apparatus according to an embodiment of this application.

When an integrated unit is used, FIG. 14 is a possible example block diagram of an apparatus according to an embodiment of this application. As shown in FIG. 14, an apparatus 1400 may include a processing unit 1402 and a communication unit 1403. The processing unit 1402 is configured to control and manage an action of the apparatus 1400. The communication unit 1403 is configured to support communication between the apparatus 1400 and another device. Optionally, the communication unit 1403 is also referred to as a transceiver unit, and may include a receiving unit and/or a sending unit, respectively configured to perform a receiving operation and a sending operation. The apparatus 1400 may further include a storage unit 1401, configured to store program code and/or data of the apparatus 1400.

The apparatus 1400 may be the first terminal device in the foregoing embodiments, or may be a chip disposed in the first terminal device. The processing unit 1402 may support the apparatus 1400 in performing the actions of the first terminal device in the foregoing method examples. Alternatively, the processing unit 1402 mainly performs the internal actions of the first terminal device in the method examples, and the communication unit 1403 may support communication between the apparatus 1400 and another device.

Specifically, in an embodiment, the communication unit 1403 is configured to monitor control information of a first cell in a first time period. The control information is used to indicate, to the first terminal device, whether to perform monitoring on a first paging occasion. The processing unit 1402 is configured to: after the communication unit 1403 monitors the control information, determine, based on the control information, whether to perform monitoring on the first paging occasion.

The first time period includes at least one time unit in which a first synchronization signal block burst set of the first cell is located, or the first time period is adjacent to time units in which the first synchronization signal block burst set is located; and the first synchronization signal block burst set is located in front of the first paging occasion in time domain.

In a possible design, the communication unit 1403 is further configured to receive time information of the first time period. The time information of the first time period includes at least one of the following: an offset of start time of the first time period, duration of the first time period, or an offset of end time of the first time period. The first time period is determined based on the time units in which the first synchronization signal block burst set of the first cell is located or a time unit in which at least one SSB in the first synchronization signal block burst set is located, and the time information of the first time period.

In a possible design, the communication unit 1403 is further configured to receive first configuration information. The first configuration information is used to configure a plurality of monitoring occasions of the control information. The processing unit 1402 is specifically configured to monitor the control information on a first monitoring occasion that is in the plurality of monitoring occasions and that is located in the first time period.

In a possible design, the communication unit 1403 is further configured to receive second configuration information. The second configuration information is used to configure a control resource set, and the control resource set is used to determine a frequency domain location of the control information in the first cell. The control resource set meets at least one of the following: a frequency domain resource corresponding to the control resource set falls within a frequency domain range within which the first synchronization signal block burst set falls; or a frequency domain resource corresponding to the control resource set falls within an activated BWP, the activated BWP is an initial bandwidth part BWP or a first BWP, the first BWP is a BWP that is configured by the access network device for the terminal device and that is used in an idle state, and the first BWP is different from the initial BWP.

The apparatus 1400 may be the access network device in the foregoing embodiments, or may be a chip disposed in the access network device. The processing unit 1402 may support the apparatus 1400 in performing the actions of the access network device in the foregoing method examples. Alternatively, the processing unit 1402 mainly performs the internal actions of the access network device in the method examples, and the communication unit 1403 may support communication between the apparatus 1400 and another device.

Specifically, in an embodiment, the communication unit 1403 is configured to: send control information of a first cell in a first time period, where the control information is used to indicate, to the first terminal device, whether to perform monitoring on a first paging occasion; and send a first message on the first paging occasion, where the first message is used to schedule a paging message. The first time period includes at least one time unit in which a first synchronization signal block burst set of the first cell is located, or the first time period is adjacent to time units in which the first synchronization signal block burst set is located; and the first synchronization signal block burst set is located in front of the first paging occasion in time domain.

In a possible design, the communication unit 1403 is further configured to send time information of the first time period. The time information of the first time period includes at least one of the following: an offset of start time of the first time period, duration of the first time period, or an offset of end time of the first time period.

In a possible design, the communication unit 1403 is further configured to send second configuration information. The second configuration information is used to configure a control resource set, and the control resource set is used to determine a frequency domain location of the control information in the first cell. The control resource set meets at least one of the following: a frequency domain resource corresponding to the control resource set falls within a frequency domain range within which the first synchronization signal block burst set falls; or a frequency domain resource corresponding to the control resource set falls within an activated BWP, the activated BWP is an initial bandwidth part BWP or a first BWP, the first BWP is a BWP that is configured by the access network device for the terminal device and that is used in an idle state, and the first BWP is different from the initial BWP.

In a possible design, the control information is further used to indicate whether the access network device is to send a first-type reference signal of the first cell in a second time period, and the first-type reference signal is used by at least one idle-state or inactive-state terminal including the first terminal device to perform synchronization or measurement. When the control information is further used to indicate that the access network device is to send the first-type reference signal of the first cell in the second time period, the communication unit 1403 is further configured to send the first-type reference signal in the second time period.

It should be understood that division of the units in the foregoing apparatus is merely logical function division. During actual implementation, all or some of the units may be integrated into one physical entity, or may be physically separated. In addition, all of the units in the apparatus may be implemented in a form of software invoked by a processing element, or may be implemented in a form of hardware; or some of the units may be implemented in a form of software invoked by a processing element, and some of the units may be implemented in a form of hardware. For example, the units may be separately disposed processing elements, or may be integrated into a chip of the apparatus for implementation. In addition, each unit may be stored in a memory in a form of a program, and invoked by a processing element of the apparatus to perform a function of the unit. In addition, all or some of the units may be integrated together, or the units may be separately implemented. The processing element herein may also be referred to as a processor, and may be an integrated circuit that has a signal processing capability. In an implementation process, the operations in the foregoing method or the foregoing units may be implemented by using an integrated logic circuit of hardware in a processing element or may be implemented in a form of software invoked by a processing element.

In an example, the unit in any one of the foregoing apparatuses may be one or more integrated circuits configured to implement the foregoing method, for example, one or more application-specific integrated circuits (ASIC), one or more microprocessors (DSP), one or more field programmable gate arrays (FPGA), or a combination of at least two of these integrated circuit forms. For another example, when the unit in the apparatus can be implemented by a processing element by scheduling a program, the processing element may be a processor, for example, a general-purpose central processing unit (CPU) or another processor that can invoke a program. For still another example, the units may be integrated and implemented in a form of a system-on-a-chip (SOC).

The foregoing unit for receiving is an interface circuit of the apparatus, and is configured to receive a signal from another apparatus. For example, when the apparatus is implemented in a chip manner, the receiving unit is an interface circuit that is used by the chip to receive a signal from another chip or apparatus. The foregoing unit for sending is an interface circuit of the apparatus, and is configured to send a signal to another apparatus. For example, when the apparatus is implemented in a chip manner, the sending unit is an interface circuit that is used by the chip to send a signal to another chip or apparatus.

Figure 15:
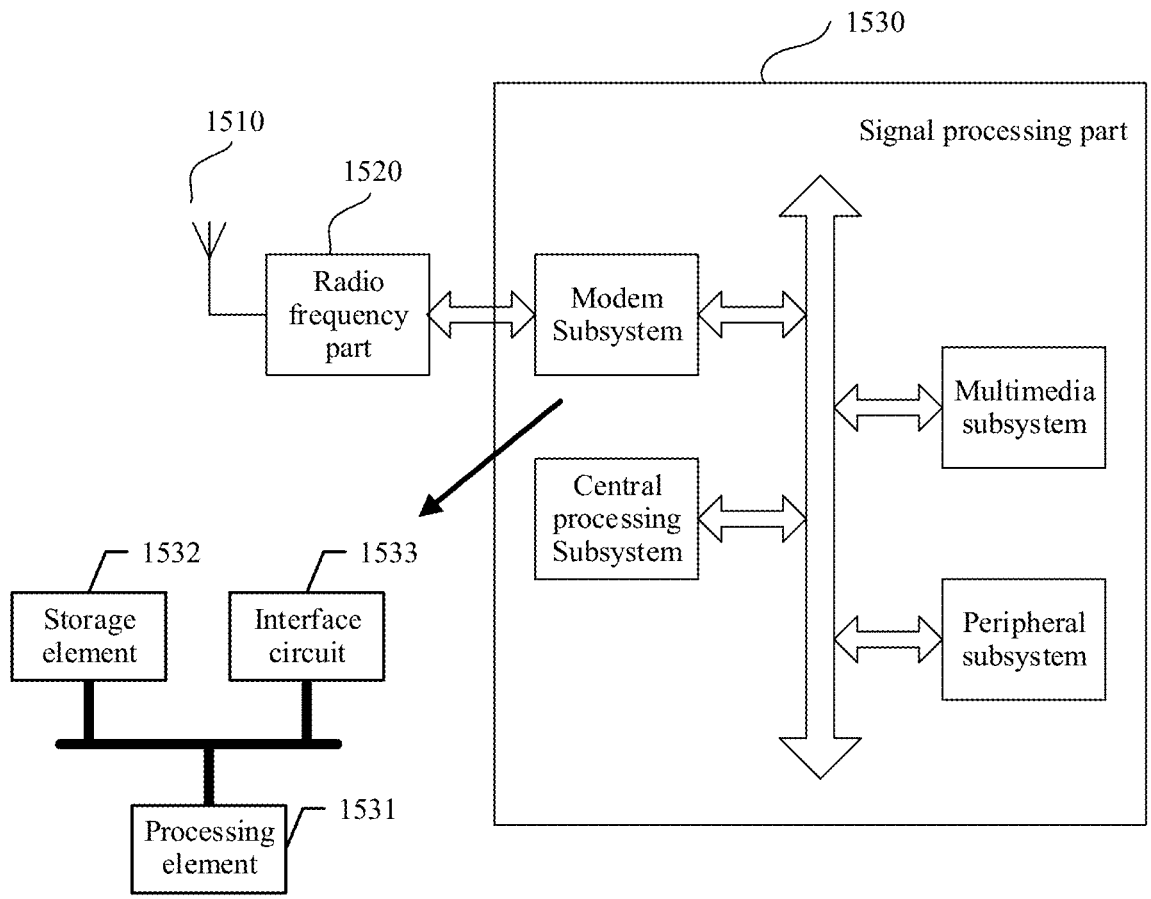
FIG. 15 is a schematic diagram of a structure of a terminal device according to an embodiment of this application.

FIG. 15 is a schematic diagram of a structure of a terminal device according to an embodiment of this application. The terminal device may be the terminal device in the foregoing embodiments, and is configured to implement the operations of the terminal device in the foregoing embodiments. As shown in FIG. 15, the terminal device includes an antenna 1510, a radio frequency part 1520, and a signal processing part 1530. The antenna 1510 is connected to the radio frequency part 1520. In a downlink direction, the radio frequency part 1520 receives, by using the antenna 1510, information sent by a network device, and sends, to the signal processing part 1530 for processing, the information sent by the network device. In an uplink direction, the signal processing part 1530 processes information of the terminal device and sends processed information of the terminal device to the radio frequency part 1520, and the radio frequency part 1520 processes the information of the terminal device and then sends processed information of the terminal device to the network device by using the antenna 1510.

The signal processing part 1530 may include a modulation and demodulation subsystem, configured to process data at each communication protocol layer, and may further include a central processing subsystem, configured to process an operating system and an application layer of the terminal device. In addition, the signal processing part 1530 may include other subsystems, for example, a multimedia subsystem and a peripheral subsystem. The multimedia subsystem is configured to control a camera, screen display, and the like of the terminal device. The peripheral subsystem is configured to implement connection to another device. The modulation and demodulation subsystem may be a separately disposed chip.

The modulation and demodulation subsystem may include one or more processing elements 1531, for example, include a main control CPU and another integrated circuit. In addition, the modulation and demodulation subsystem may further include a storage element 1532 and an interface circuit 1533. The storage element 1532 is configured to store data and a program. However, a program used to perform the method performed by the terminal device in the foregoing methods may not be stored in the storage element 1532, but is stored in a memory outside the modulation and demodulation subsystem, and is loaded by the modulation and demodulation subsystem for use when being used. The interface circuit 1533 is configured to communicate with another subsystem.

The modulation and demodulation subsystem may be implemented by using a chip. The chip includes at least one processing element and an interface circuit. The processing element is configured to perform the steps of any one of the foregoing methods performed by the terminal device. The interface circuit is configured to communicate with another apparatus. In an implementation, units in the terminal device for implementing the steps in the foregoing methods may be implemented in a form of scheduling a program by a processing element. For example, the apparatus used in the terminal device includes a processing element and a storage element. The processing element invokes a program stored in the storage element, to perform the methods performed by the terminal device in the foregoing method embodiments. The storage element may be a storage element located on a same chip as the processing element, namely, an on-chip storage element.

In another implementation, the program used to perform the method performed by the terminal device in the foregoing methods may be stored in a storage element located on a different chip from the processing element, namely, an off-chip storage element. In this case, the processing element invokes or loads the program from the off-chip storage element to an on-chip storage element, to invoke and perform the method performed by the terminal device in the foregoing method embodiments.

In still another implementation, the units for implementing the steps in the foregoing method in the terminal device may be configured as one or more processing elements. These processing elements are disposed in the modulation and demodulation subsystem. The processing element herein may be an integrated circuit, for example, one or more ASICs, one or more DSPs, one or more FPGAs, or a combination of these types of integrated circuits. The integrated circuits may be integrated together to form a chip.

The units for implementing the steps in the foregoing method in the terminal device may be integrated together and implemented in a form of an SOC. The SOC is configured to implement the foregoing method. At least one processing element and storage element may be integrated into the chip, and the processing element invokes a program stored in the storage element to implement the foregoing methods performed by the terminal device. Alternatively, at least one integrated circuit may be integrated into the chip, to implement the foregoing methods performed by the terminal device. Alternatively, with reference to the foregoing implementations, functions of some units may be implemented by invoking a program by the processing element, and functions of some units may be implemented by the integrated circuit.

It can be learned that the foregoing apparatus used as the terminal device may include at least one processing element and an interface circuit, and the at least one processing element is configured to perform any method performed by the terminal device according to the foregoing method embodiments. The processing element may perform, in a first manner, to be specific, by invoking the program stored in the storage element, some or all steps performed by the terminal device; or may perform, in a second manner, to be specific, by using a hardware integrated logic circuit in the processor element in combination with instructions, some or all steps performed by the terminal device; or may certainly perform, by combining the first manner and the second manner, some or all steps performed by the terminal device.

The processing element herein is the same as that described above, and may be implemented by using a processor. A function of the processing element may be the same as the function of the processing unit described in FIG. 14. For example, the processing element may be a general-purpose processor, for example, a CPU, or may be one or more integrated circuits configured to implement the foregoing methods, for example, one or more ASICs, one or more microprocessors DSPs, or one or more FPGAs, or a combination of at least two of the integrated circuit forms. The storage element may be implemented by using a memory, and a function of the storage element may be the same as the function of the storage unit described in FIG. 14. The storage element may be implemented by using a memory, and a function of the storage element may be the same as the function of the storage unit described in FIG. 14. The storage element may be one memory, or may be a general term of a plurality of storage elements.

The terminal device shown in FIG. 15 can implement the processes related to the terminal device in the foregoing method embodiments. Operations and/or functions of the modules in the terminal device shown in FIG. 15 are respectively used to implement the corresponding procedures in the foregoing method embodiments. For details, refer to the descriptions in the foregoing method embodiments. To avoid repetition, detailed descriptions are properly omitted herein.

Figure 16:
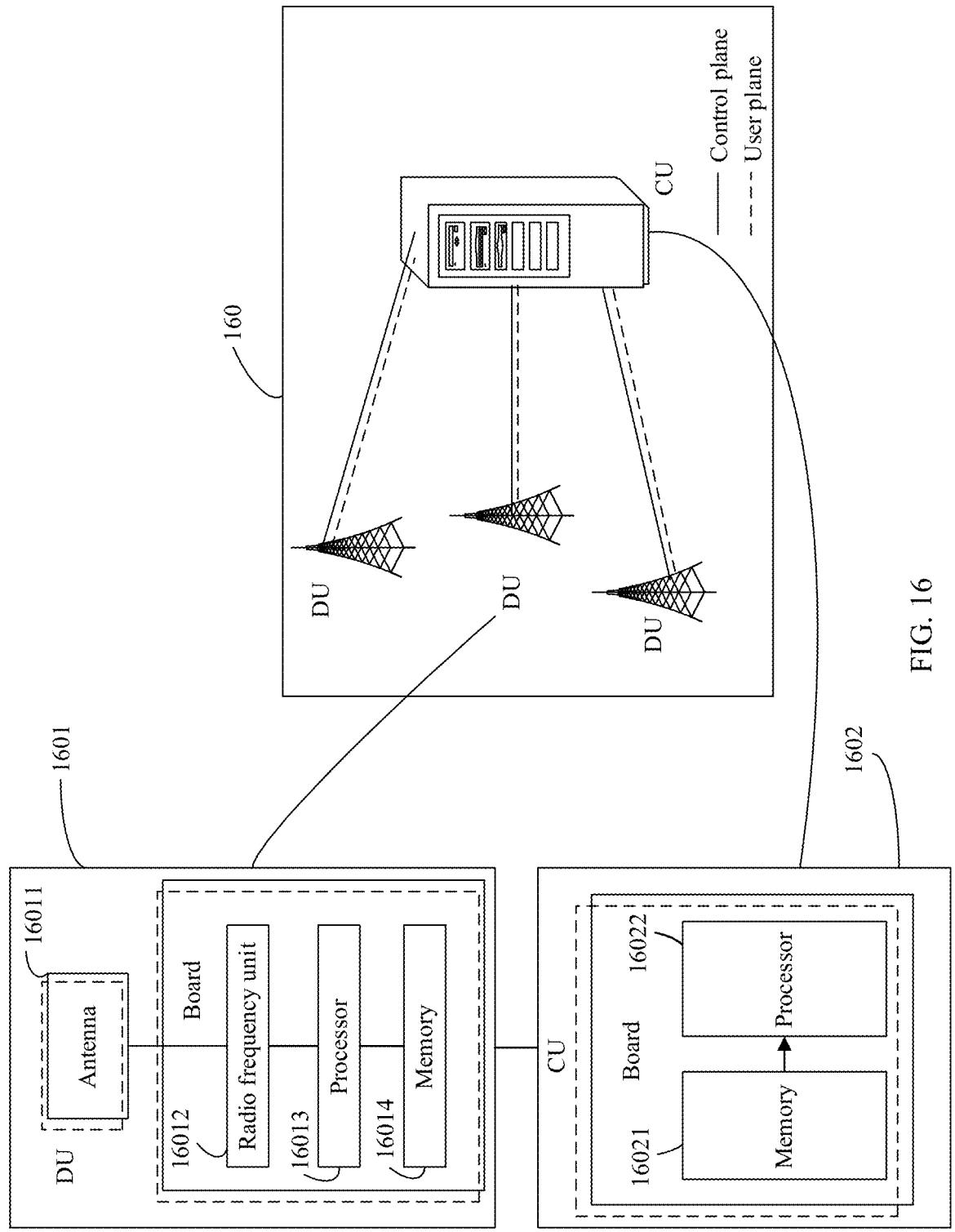
FIG. 16 is a schematic diagram of a structure of an access network device according to an embodiment of this application.

FIG. 16 is a schematic diagram of a structure of an access network device according to an embodiment of this application. The access network device (or a base station) may be applied to the system architecture shown in FIG. 1, to perform the function of the access network device in the foregoing method embodiments. An access network device 160 may include one or more DUs 1601 and one or more CUs 1602. The DU 1601 may include at least one antenna 16011, at least one radio frequency unit 16012, at least one processor 16013, and at least one memory 16014. The DU 1601 is mainly configured to: send/receive a radio frequency signal, perform conversion between a radio frequency signal and a baseband signal, and perform some baseband processing. The CU 1602 may include at least one processor 16022 and at least one memory 16021.

The CU 1602 is mainly configured to: perform baseband processing, control the access network device, and so on. The DU 1601 and the CU 1602 may be physically disposed together, or may be physically disposed separately, that is, may be a distributed base station. The CU 1602 is a control center of the access network device, may also be referred to as a processing unit, and is mainly configured to complete a baseband processing function. For example, the CU 1602 may be configured to control the access network device to perform the operation procedure about the access network device in the foregoing method embodiments.

In addition, optionally, the access network device 160 may include one or more radio frequency units, one or more DUs, and one or more CUs. The DU may include at least one processor 16013 and at least one memory 16014. The radio frequency unit may include at least one antenna 16011 and at least one radio frequency unit 16012. The CU may include at least one processor 16022 and at least one memory 16021.

In an example, the CU 1602 may include one or more boards, and a plurality of boards may jointly support a radio access network (for example, a 5G network) of a single access standard, or may separately support radio access networks (for example, an LTE network and a 5G network) of different access standards. The memory 16021 and the processor 16022 may serve one or more boards. In other words, a memory and a processor may be disposed on each board. Alternatively, a plurality of boards may share a same memory and a same processor. In addition, a necessary circuit may further be disposed on each board. The DU 1601 may include one or more boards, and a plurality of boards may jointly support a radio access network (for example, a 5G network) of a single access standard, or may separately support radio access networks (for example, an LTE network and a 5G network) of different access standards. The memory 16014 and the processor 16013 may serve one or more boards. In other words, a memory and a processor may be disposed on each board. Alternatively, a plurality of boards may share a same memory and a same processor. In addition, a necessary circuit may further be disposed on each board.

The access network device shown in FIG. 16 can implement the processes related to the access network device in the foregoing method embodiments. Operations and/or functions of the modules in the access network device shown in FIG. 16 are respectively used to implement the corresponding procedures in the foregoing method embodiments. For details, refer to the descriptions in the foregoing method embodiments. To avoid repetition, detailed descriptions are properly omitted herein.

A person skilled in the art should understand that the embodiments of this application may be provided as a method, a system, or a computer program product. Therefore, this application may use a form of hardware only embodiments, software only embodiments, or embodiments with a combination of software and hardware. In addition, this application may use a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

The computer program instructions may alternatively be loaded onto a computer or another programmable data processing device, so that a series of operations and steps are performed on the computer or the another programmable device, so that computer-implemented processing is generated. Therefore, the instructions executed on the computer or the another programmable device provide steps for implementing a specific function in one or more procedures in the flowcharts and/or in one or more blocks in the block diagrams.

It is clear that a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A communication method applicable to a terminal device, the method comprising:
receiving configuration information that identifies a plurality of monitoring occasions in each paging message;
monitoring a paging message for a time period comprising the plurality of monitoring occasions for a presence of control information sent from a cell,
wherein the time period overlaps in time with a synchronization signal block burst set of the cell in the paging message,
wherein the monitoring occasions are occasions in the time period that allow for monitoring for the control information without interference from the synchronization signal block burst set, and
wherein the control information indicates to the terminal device whether to monitor a paging occasion in the plurality of paging occasions; and
determining, based on the control information, whether to monitor the paging occasion,
wherein the time period comprises at least one time unit in which the synchronization signal block burst set of the cell is located, or the time period is adjacent to time units in which the synchronization signal block burst set is located, and
wherein the synchronization signal block burst set is located in front of the paging occasion in a time domain.

2. The method according to claim 1, wherein the synchronization signal block burst set is any one of last N synchronization signal block burst sets located in front of the paging occasion, and wherein N is a positive integer.

3. The method according to claim 1, wherein:
in response to the time period comprising the at least one time unit in which the synchronization signal block burst set is located, a start time of the time period is not earlier than a start time of the time unit in which the first synchronization signal block burst set is located; or in response to the time period is adjacent to the time units in which the synchronization signal block burst set is located, a start time of the time period is an end time of a last time unit in which the synchronization signal block burst set is located.

4. The method according to claim 1, wherein an end time of the time period is not later than a preset time, and the preset time is not later than a start time of the paging occasion.

5. The method according to claim 1, wherein the time period is determined based on the time units in which the synchronization signal block burst set of the cell is located or a time unit in which at least one synchronization signal block (SSB) in the synchronization signal block burst set is located.

6. A communication method applicable to an access network device, and the method comprising:
sending configuration information identifying a plurality of monitoring occasions in a paging message,
wherein the paging message includes a plurality of paging occasions,
wherein the plurality of monitoring occasions comprise occasions in a time period of the paging message that allow for monitoring the paging message for control information of a cell without interference from a synchronization signal block burst set of the cell in the paging message, and
wherein the time period overlaps in time with the synchronization signal block burst set;
sending the paging message with the control information of the cell in one of the plurality of monitoring occasions,
wherein the control information indicates to a terminal device whether to monitor a paging occasion in the plurality of paging occasions; and
sending a message on the paging occasion indicated by the control information,
wherein the time period comprises at least one time unit in which a synchronization signal block burst set of the cell is located, or the time period is adjacent to time units in which the synchronization signal block burst set is located, and
wherein the synchronization signal block burst set is located in front of the paging occasion in a time domain.

7. The method according to claim 6, wherein the synchronization signal block burst set is any one of last N synchronization signal block burst sets located in of the first paging occasion, and wherein N is a positive integer.

8. The method according to claim 6, wherein:
in response to the time period comprising the at least one time unit in which the synchronization signal block burst set is located, a start time of the time period is not earlier than a start time of a time unit in which the synchronization signal block burst set is located; or
the start time of the time period is not earlier than a start time of a time unit in which a particular synchronization signal block (SSB) in the synchronization signal block burst set is located.

9. The method according to claim 6, wherein in response to the time period being adjacent to the time units in which the synchronization signal block burst set is located, a start time of the time period is an end time of a last time unit in which the synchronization signal block burst set is located.

10. The method according to claim 6, wherein an end time of the time period is not later than a preset time, and wherein the preset time is not later than a start time of the paging occasion.

11. An apparatus comprising at least one processor and at least one memory storing instructions, wherein the instructions are executed by the at least one processor to cause the apparatus to perform operations of:
receiving configuration information that identifies a plurality of monitoring occasions in each paging message;
monitoring a paging message for a time period comprising the plurality of monitoring occasions for a presence of control information sent from a cell,
wherein the time period overlaps in time with a synchronization signal block burst set of the cell in the paging message,
wherein the monitoring occasions are occasions in the time period that allow for monitoring for the control information without interference from the synchronization signal block burst set, and
wherein the control information indicates, to the apparatus, whether to monitor a paging occasion in the plurality of paging occasions; and
determining, based on the control information, whether to monitor the paging occasion,
wherein the time period comprises at least one time unit in which a synchronization signal block burst set of the cell is located, or the time period is adjacent to time units in which the synchronization signal block burst set is located, and
wherein the synchronization signal block burst set is located in front of the paging occasion in a time domain.

12. The apparatus according to claim 11, wherein the synchronization signal block burst set is any one of last N synchronization signal block burst sets located in front of the paging occasion, and wherein N is a positive integer.

13. The apparatus according to claim 11, wherein:
in response to the time period comprising the at least one time unit in which the synchronization signal block burst set is located, a start time of the time period is not earlier than a start time of the time unit in which the synchronization signal block burst set is located; or
in response to the time period is adjacent to the time units in which the synchronization signal block burst set is located, a start time of the time period is an end time of the last time unit in which the synchronization signal block burst set is located.

14. The apparatus according to claim 11, wherein an end time of the time period is not later than a preset time that is not later than a start time of the paging occasion.

15. The apparatus according to claim 11, wherein the time period is determined based on the time units in which the synchronization signal block burst set of the cell is located or a time unit in which at least one synchronization signal block (SSB) in the synchronization signal block burst set is located.

16. An apparatus comprising at least one processor and at least one memory storing instructions, wherein the instructions are executed by the at least one processor to cause the apparatus to perform operations of:
sending configuration information identifying a plurality of monitoring occasions in a paging message,
wherein the paging message includes a plurality of paging occasions,
wherein the plurality of monitoring occasions comprise occasions in a time period of the paging message that allow for monitoring the paging message for control information of a cell without interference from a synchronization signal block burst set of the cell in the paging message, and wherein the time period overlaps in time with the synchronization signal block burst set;

sending the paging message with the control information of the cell in one of the plurality of monitoring occasions, wherein the control information indicates to a terminal device whether to monitor a paging occasion in the plurality of paging occasions; and sending a message on the paging occasion indicated by the control information, wherein the time period comprises at least one time unit in which a synchronization signal block burst set of the cell is located, or the time period is adjacent to time units in which the synchronization signal block burst set is located, and wherein the synchronization signal block burst set is located in front of the paging occasion in a time domain.

17. The apparatus according to claim 16, wherein the synchronization signal block burst set is any one of last N synchronization signal block burst sets located in front of the paging occasion, and wherein N is a positive integer.

18. The apparatus according to claim 16, wherein:

in response to the time period comprising the at least one time unit in which the synchronization signal block burst set is located, a start time of the time period is not earlier than a start time of a time unit in which the synchronization signal block burst set is located; or the start time of the time period is not earlier than a start time of a time unit in which a particular synchronization signal block (SSB) in the synchronization signal block burst set is located.

19. The apparatus according to claim 16, wherein in response to the time period being adjacent to the time units in which the synchronization signal block burst set is located, a start time of the time period is an end time of the last time unit in which the synchronization signal block burst set is located.

20. The apparatus according to claim 16, wherein an end time of the time period is not later than a preset time, and wherein the preset time is not later than a start time of the first paging occasion.

* * * * *